United States Patent
Burnham et al.

(10) Patent No.: US 11,097,477 B2
(45) Date of Patent: *Aug. 24, 2021

(54) SYSTEM AND METHOD FOR MOVING A ROD OF BUILD MATERIAL USING A PUSHER IN A 3D PRINTING SYSTEM

(71) Applicant: Desktop Metal, Inc., Burlington, MA (US)

(72) Inventors: Richard Burnham, Gloucester, MA (US); John LaPlante, Concord, NH (US); Aaron Preston, Arlington, MA (US)

(73) Assignee: Desktop Metal, Inc., Burlington, MA (US)

( * ) Notice: Subject to any disclaimer, the term of this patent is extended or adjusted under 35 U.S.C. 154(b) by 169 days.

This patent is subject to a terminal disclaimer.

(21) Appl. No.: 16/580,785

(22) Filed: Sep. 24, 2019

(65) Prior Publication Data

US 2020/0016835 A1    Jan. 16, 2020

Related U.S. Application Data

(63) Continuation of application No. 15/961,817, filed on Apr. 24, 2018, now Pat. No. 10,464,260.
(Continued)

(51) Int. Cl.
*B33Y 30/00* (2015.01)
*B29C 64/232* (2017.01)
(Continued)

(52) U.S. Cl.
CPC .......... *B29C 64/232* (2017.08); *B29C 64/118* (2017.08); *B29C 64/205* (2017.08);
(Continued)

(58) Field of Classification Search
CPC ... B29C 64/232; B29C 64/106; B29C 64/118; B29C 64/321; B05C 17/0053; B05C 17/00533
See application file for complete search history.

(56) References Cited

U.S. PATENT DOCUMENTS 3,684,145 A    8/1972  Jenkins
4,032,046 A    6/1977  Montgomery et al.
(Continued)

FOREIGN PATENT DOCUMENTS

CN    103736628 A    4/2014
CN    106262994 A    1/2017
(Continued)

OTHER PUBLICATIONS

International Search Report and Written Opinion for International Application No. PCT/US2018/029231, entitled "Moving a Rod of Build Material Using a Pusher in a 3D Printing System," consisting of 13 pages. dated Aug. 2, 2018.
(Continued)

*Primary Examiner* — Atul P. Khare
(74) *Attorney, Agent, or Firm* — Oak Law, PLLC; Jonathan D. Hall

(57) ABSTRACT

A system and corresponding method to move a rod of build material in a three-dimensional (3D) printing system uses a pusher. The rod of build material has distal and proximal ends relative to an extrusion head. The distal and proximal ends having distal and proximal end surfaces, respectively. The pusher engages with the rod and applies an axial force to at least a portion of the distal end surface of the rod for at least a portion of a path the rod travels toward the extrusion head. The axial force actuates the rod of build material without alteration, such as by shaving, fracturing, or otherwise deforming the rod of build material.

20 Claims, 22 Drawing Sheets

Related U.S. Application Data

(60) Provisional application No. 62/489,306, filed on Apr. 24, 2017.

(51) Int. Cl.

| | | |
|---|---|---|
| *B29C 64/209* | (2017.01) | |
| *B29C 64/118* | (2017.01) | |
| *B29C 64/393* | (2017.01) | |
| *B33Y 50/02* | (2015.01) | |
| *B33Y 10/00* | (2015.01) | |
| *B29C 64/205* | (2017.01) | |
| *B29C 64/227* | (2017.01) | |
| *B33Y 40/00* | (2020.01) | |
| *B29C 64/321* | (2017.01) | |
| *B29C 48/475* | (2019.01) | |
| *B29C 64/141* | (2017.01) | |

(52) U.S. Cl.
CPC .......... *B29C 64/209* (2017.08); *B29C 64/227* (2017.08); *B29C 64/321* (2017.08); *B29C 64/393* (2017.08); *B33Y 10/00* (2014.12); *B33Y 30/00* (2014.12); *B33Y 40/00* (2014.12); *B33Y 50/02* (2014.12); *B29C 64/141* (2017.08)

(56) References Cited

U.S. PATENT DOCUMENTS

| | | |
|---|---|---|
| 4,480,490 A | 11/1984 | Inoue |
| 4,556,775 A | 12/1985 | Inoue |
| 4,815,636 A | 3/1989 | Stede et al. |
| 5,094,340 A | 3/1992 | Avakov |
| 6,085,627 A | 7/2000 | Denney |
| 8,778,252 B2 | 7/2014 | Mackie et al. |
| 8,944,802 B2 | 2/2015 | Patterson et al. |
| 9,095,425 B2 * | 8/2015 | Meyer ...................... A61F 2/167 |
| 10,092,975 B2 * | 10/2018 | Twelves, Jr. ........... B33Y 30/00 |
| 10,112,343 B2 * | 10/2018 | Jeong ...................... B25J 9/023 |
| 10,201,503 B1 * | 2/2019 | Li ........................... B29C 64/321 |
| 10,456,978 B2 * | 10/2019 | Costlow .................. B29C 64/30 |
| 10,596,757 B2 * | 3/2020 | Erb ......................... B29C 64/357 |
| 10,688,719 B2 * | 6/2020 | Susnjara ................. B29C 64/379 |
| 10,780,635 B1 * | 9/2020 | Susnjara ................. B29C 64/232 |
| 10,899,069 B2 * | 1/2021 | Lorusso .................. B33Y 30/00 |
| 10,960,601 B2 * | 3/2021 | Bruggeman .......... B29C 64/393 |
| 2007/0040006 A1 | 2/2007 | Charles R. et al. |
| 2009/0200275 A1 | 8/2009 | Twelves, Jr. et al. |
| 2013/0241102 A1 | 9/2013 | Rodgers et al. |
| 2014/0328963 A1 | 11/2014 | Mark et al. |
| 2015/0307385 A1 | 10/2015 | Klein et al. |
| 2016/0038655 A1 | 2/2016 | Weisman et al. |
| 2016/0046081 A1 * | 2/2016 | Kim ....................... B29C 48/05 |
| | | 425/143 |
| 2016/0075089 A1 | 3/2016 | Duro |
| 2016/0136886 A1 | 5/2016 | Jeong |
| 2017/0190118 A1 | 7/2017 | Mire et al. |
| 2017/0369827 A1 * | 12/2017 | Langenfeld ......... A61L 27/3808 |
| 2018/0304533 A1 | 10/2018 | Burnham et al. |

FOREIGN PATENT DOCUMENTS

| | | | |
|---|---|---|---|
| EP | 2617554 A1 * | 7/2013 | ............ B29C 64/209 |
| WO | 2015/120538 A1 | 8/2015 | |
| WO | 2018/200594 A1 | 11/2018 | |

OTHER PUBLICATIONS

"Ratcheted Filament Driver," blog at http://blog.reprap.org/2008/03/ratcheted-filament-driver.html, downloaded from the internet on Apr. 23, 2018.

\* cited by examiner

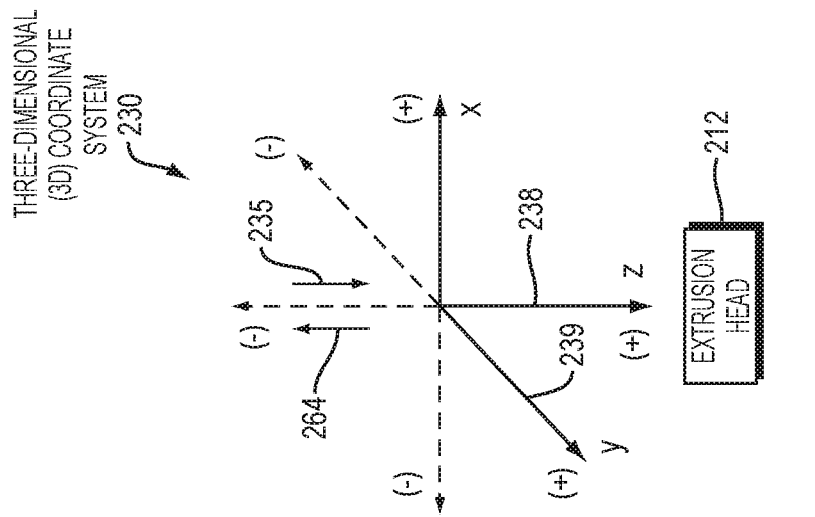
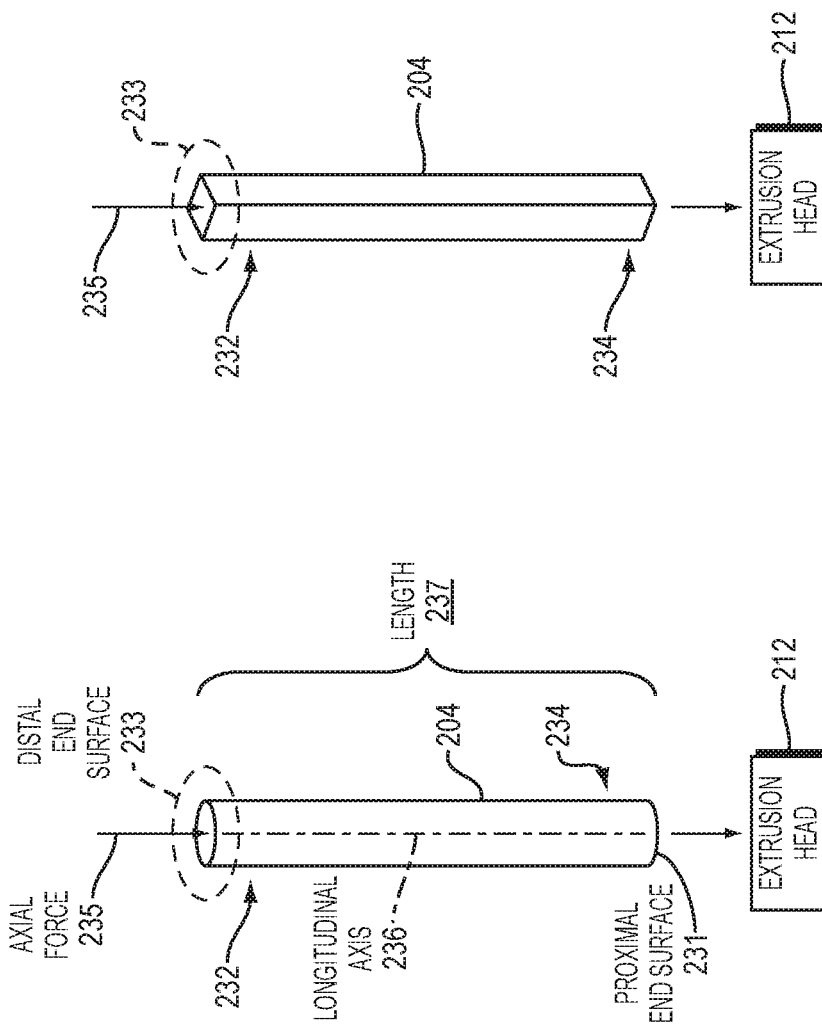

SYSTEM AND METHOD FOR MOVING A ROD OF BUILD MATERIAL USING A PUSHER IN A 3D PRINTING SYSTEM

RELATED APPLICATION

This application is a continuation of U.S. application Ser. No. 15/961,817, filed on Apr. 24, 2018, which claims the benefit of U.S. Provisional Application No. 62/489,306, filed on Apr. 24, 2017. The entire teachings of the above applications are incorporated herein by reference.

BACKGROUND

Fused filament fabrication (FFF) provides a technique for fabricating three-dimensional (3D) objects from a thermoplastic or from similar materials. Machines using this technique can fabricate a 3D object, additively, by depositing materials in layers to build up a physical object, additively, layer-by-layer, based on a computer model of the 3D object.

SUMMARY

According to an example embodiment, an extrusion assembly for use in a three-dimensional (3D) printing system may include an extrusion head configured to receive a rod of build material having distal and proximal ends relative to the extrusion head, the distal and proximal ends having distal and proximal end surfaces, respectively. The extrusion assembly may include an actuation assembly including a pusher, the pusher arranged to apply an axial force to at least a portion of the distal end surface of the distal end of the rod. The axial force may be applied to the at least a portion of the distal end surface for at least a portion of a path the rod travels toward the extrusion head.

The distal end surface may be a normal surface or feature that is normal relative to a longitudinal axis of the rod of build material.

The actuation assembly may further include an actuating component coupled to the pusher and a driving component coupled to the actuating component. The driving component may be configured to drive the actuating component in a manner that causes bi-directional linear motion of the pusher relative to the extrusion head. The axial force may be applied as a function of the pusher being caused to move, linearly, toward the extrusion head.

The actuating component may be a lead screw and the driving component may be a motor.

The actuation assembly may further include an actuating component. The pusher may include a traveling component and a pushing component. The traveling component may be arranged to travel, linearly, along a linear actuation path defined by the actuating component, to cause linear motion of the pushing component.

The pusher may include a pusher interface and the pusher interface may be arranged to engage with the at least a portion of the distal end surface.

The pusher interface may include complementary features relative to surface features of the at least a portion of the distal end surface of the rod of build material.

The pusher may include a traveling component and a pushing component and the pushing component may include at least one cantilevered protrusion of the traveling component.

The pusher may include a traveling component arranged to cause motion of the pusher. The traveling component may be a nut.

The pusher may include a traveling component. The actuation assembly may further include an actuating component arranged to move the traveling component and a linear guide coupled to the traveling component via a linear bearing. The linear guide and the linear bearing may be arranged to absorb a load otherwise transferred to the actuating component due to application of the axial force.

The linear guide may be a linear rail.

The extrusion assembly may further comprise a guide channel. The pusher may include a pushing component. The at least a portion of the path the rod travels toward the extrusion head may be defined by the guide channel. The guide channel may be define at least one slot to receive the pushing component.

The guide channel may be arranged to contact at least a portion of the rod of build material to provide alignment for the at least a portion of the rod.

The pusher may include a pushing component. The actuation assembly may further include a cam arranged to cause the pushing component to transition between a media load position and a media extrude position as a function of surface contact between the cam and the pushing component.

In the media load position, the pushing component may be arranged to be out of the path the rod travels toward the extrusion head. In the media extrude position, at least a portion of the pushing component may be arranged to be in the path the rod travels toward the extrusion head.

The extrusion assembly may include a media entrance arranged to load the rod of build material into the extrusion assembly. The path the rod travels toward the extrusion head may be from the media entrance to the extrusion head.

According to another example embodiment, a method for moving a rod of build material in a three-dimensional (3D) printing system may comprise engaging a rod of build material, loaded into an extrusion assembly including an extrusion head, with a pusher, the rod having distal and proximal ends relative to the extrusion head, the distal and proximal ends having distal and proximal end surfaces, respectively. The method may comprise applying an axial force to at least a portion of the distal end surface of the distal end of the rod. The axial force may be applied, by the pusher, to the at least a portion of the distal end surface for at least a portion of a path the rod travels toward the extrusion head in the 3D printing system.

The method may comprise driving an actuating component to cause the pusher to move between a home location and a reset location within the extrusion assembly. The home location and the reset location may be distal and proximal pusher locations, respectively, of the pusher relative to the extrusion head. The method may comprise sensing whether the pusher is located at the home and reset locations.

The sensing may be based on feedback from a sensing device.

The sensing may be performed in an open-loop manner as a function of a theoretical commanded location.

The rod of build material may be a first rod of build material and the method may further comprise driving the actuating component in a manner that causes the pusher to move from the reset location to the home location in response to the reset location being sensed. The method may further comprise loading a second rod of build material into the extrusion assembly in response to the home location being sensed.

The pusher may include a traveling component and a pushing component. The method may further comprise moving the pushing component between a media load position and an extrusion position. The media load position may be employed for loading the rod of build material and the extrusion position may be employed for extruding the rod of build material.

The pusher may include a traveling component and a pushing component. The method may further comprise driving an actuating component coupled to the traveling component. The driving may cause rotation of the actuating component that, in turn, may cause linear motion of the pusher.

The linear motion may include a first linear motion toward the extrusion head and a second linear motion away from the extrusion head and the applying may include driving the actuating component in a manner that causes the second linear motion.

The method may further comprise loading the rod of build material into a guide channel. The guide channel may define the at least a portion of the path the rod travels toward the extrusion head.

The method may further comprise contacting a rod surface of the rod with at least a portion of an inner surface of the guide channel. The contacting may cause the rod to be aligned within the guide channel.

The pusher may include a traveling component and a pushing component and the method may further comprise loading the rod of build material into a guide channel, the guide channel defining at least one slot; driving an actuating component coupled to the traveling component; traversing the actuating component with the traveling component in a first direction away from the extrusion head in response to the driving; and traversing a given slot of the at least one slot with the pushing component in a second direction toward the extrusion head to apply the axial force in response to the traversing of the actuating component in the first direction.

According to another example embodiment, an actuation system for use in a three-dimensional (3D) printing system may comprise a pusher; an actuating component coupled to the pusher; a driving component configured to drive the actuating component; and a controller. The controller may be configured to cause the driving component to drive the actuating component to move in a manner that causes the pusher to apply an axial force to at least a portion of a distal end surface of a distal end of a rod of a build material. The rod may have distal and proximal ends relative to an extrusion head. The distal and proximal ends may have distal and proximal end surfaces, respectively. The axial force may be applied to the at least a portion of the distal end surface of the rod for at least a portion of a path the rod travels toward the extrusion head in the 3D printing system.

According to another example embodiment, an apparatus for moving a rod of build material in a three-dimensional (3D) printing system may comprise means for engaging a rod of build material having distal and proximal ends relative to an extrusion head, the distal and proximal ends having distal and proximal end surfaces, respectively; and means for applying an axial force to at least a portion of the distal end surface of the distal end of the rod. The axial force may be applied to the at least a portion of the cross-sectional surface for at least a portion of a path the rod travels toward the extrusion head.

According to an example embodiment, an extrusion assembly for use in a three-dimensional (3D) printing system may include an extrusion head configured to receive a build material and an actuation assembly. The actuation assembly may include an actuating component and a gripper. The gripper may be arranged to apply at least two opposing lateral forces to the build material, the at least two opposing lateral forces being applied to the build material for at least a portion of a path the build material travels toward the extrusion head. The actuating component may be arranged to cause linear motion of the gripper for the at least a portion of the path.

The actuation assembly may further include a gripper guide, the gripper guide arranged to cause the gripper to apply the at least two opposing lateral forces.

The actuation assembly may further include a spring arranged to cause the gripper guide to move in a direction away from the extrusion head and toward a home position for the gripper guide within the actuation assembly.

The extrusion assembly may include an extrusion frame arranged to house the gripper, a gripper guide for the gripper, and a spring.

The extrusion frame may define a stopping ledge within the frame, the stopping ledge arranged to stop movement of the gripper guide in a direction away from the extrusion head. The stopping ledge may define a home position for the gripping guide and the gripper.

The extrusion assembly may further comprise a traveling component. The gripper may be coupled to the traveling component and the actuation assembly may further include: a gripper guide arranged to cause the gripper to dilate and contract within the gripper guide and a driving component configured to drive the actuating component to cause the traveling component to move bi-directionally relative to the extrusion head.

The extrusion assembly may further comprise a traveling component. The traveling component may define a hollow core configured to enable the build material to pass through the traveling component and toward the extrusion head.

The build material may be in a form of a discrete rod or continuous feedstock.

The gripper may be arranged to apply the at least two lateral forces via vacuum.

The actuation assembly may further comprise a first belt and a second belt and the build material may be arranged between surfaces of the first belt and second belts.

The gripper may be coupled to the first belt and the second belt and arranged to apply the at least two lateral forces to the build material via the first and second belts.

The gripper may include: a linear element; a first rolling element; a second rolling element; a first gripping element; and a second gripping element. The linear element may be coupled to the first and second gripping elements and at least two rolling elements.

The extrusion assembly may further comprise a linear guide and the gripper may be arranged to travel the linear guide.

According to another example embodiment, a method for moving build material in a three-dimensional (3D) printing system may comprise applying at least two opposing lateral forces to a build material via a gripper, the at least two opposing lateral forces being applied to the build material for at least a portion of a path the build material travels toward an extrusion head. The method may comprise causing linear motion of the gripper for the at least a portion of the path the build material travels toward the extrusion head.

The linear motion of the gripper may cause the gripper to enter a gripper guide and the method may further comprise compressing and dilating the gripper via a profile of an internal surface of the guide.

The applying may include driving an actuating component in a manner that causes opposing surfaces of the gripper to engage with opposing surfaces of the build material via respective couplings and wherein the linear motion of the gripper causes rotation of the respective couplings.

The respective couplings may be belts.

An actuation system for use in a three-dimensional (3D) printing system may comprise a gripper coupled to a traveling component; an actuating component coupled to the traveling component; a driving component configured to drive the actuating component; and a controller configured to activate and deactivate the driving component.

The driving component may be further configured to drive the actuating component to cause the traveling component to move bi-directionally relative to an extrusion head.

According to an example embodiment, an apparatus for moving build material in a three-dimensional (3D) printing system may comprise means for applying at least two opposing lateral forces to the build material, the at least two opposing lateral forces being applied to the build material for at least a portion of a path the build material travels toward the extrusion head; and means for causing linear motion concurrent, with engagement of the build material, for the at least a portion of the path the build material travels toward the extrusion head in the 3D printing system.

It should be understood that example embodiments disclosed herein can be implemented in the form of a method, apparatus, system, or computer readable medium with program codes embodied thereon.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIG. 2B is a block diagram of an example embodiment of a distal end surface of a rod of build material.

FIG. 2C is a block diagram of another example embodiment of the distal end surface of the rod of build material.

FIG. 2D is a block diagram of an example embodiment of a 3D coordinate system and the axial force.

FIG. 2I is a CAD drawing of a cross-sectional view of an example embodiment of the cam of FIG. 2F.

DETAILED DESCRIPTION

Figure 1:
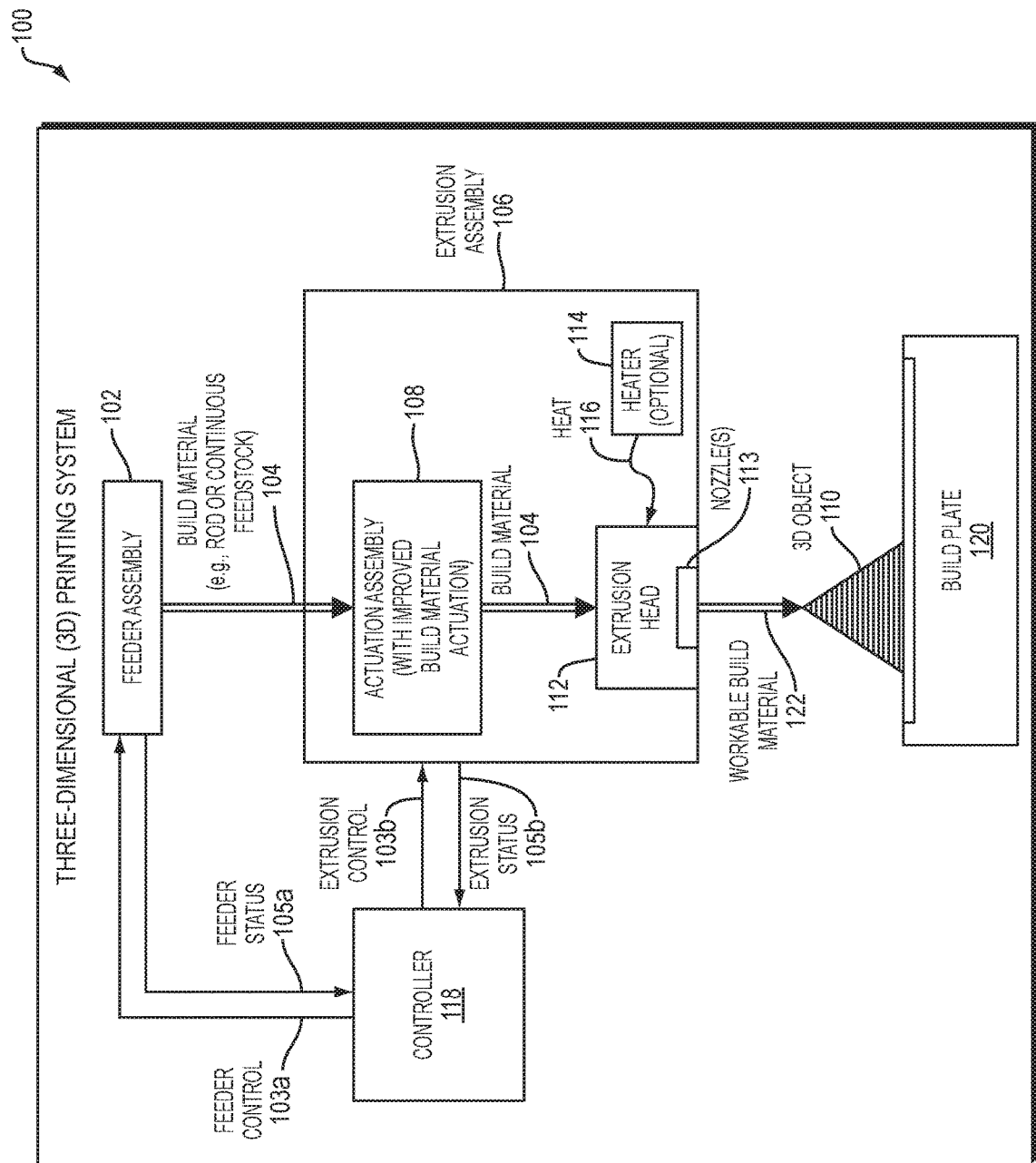
FIG. 1 is a block diagram of an example embodiment of a three-dimensional (3D) printing system.

A description of example embodiments follows.

Fused filament fabrication (FFF) provides a technique for fabricating three-dimensional (3D) objects from a thermoplastic or from similar materials. Machines using this technique can fabricate a 3D object, additively, by depositing materials in layers to build up a physical object, additively, layer-by-layer, based on a computer model of the 3D object. While these polymer-based techniques have been changed and improved over the years, the physical principles applicable to polymer-based systems may not be applicable to metal-based systems, which tend to pose different challenges, as disclosed below.

In extrusion technologies for additive manufacturing, referred to interchangeably herein as 3D printing or 3DP, printers often utilize a pair of drive gears (with or without teeth) to actuate a thermoplastic feedstock into a liquefying extruder. The drive gears engage the media, that is, the feedstock, which provides traction and enables transmission of force to convert circular motion of the gears into a linear translation of the feedstock. Since the pressure to extrude the media can be quite large (e.g., exceeding 10 atmospheres), a large force is necessarily imparted at the interface between a roller and the feedstock. Such forces cause an elastic deformation of the media and may additionally lead to plastic deformation, fracture, and shaving, or slip/stripping of media on the rollers. Preventing and eliminating slipping and stripping errors may be useful in ensuring a steady and predictable extrusion of the manufacturing process.

A demand for printed structures composed of metals and ceramics with low production times creates a need for high-speed printing of metal- and ceramic-laden thermoplastic materials. These materials are more susceptible to failure within the geared teeth roller design, disclosed above, both by slipping and stripping, owing to their increased brittleness as compared to traditional 3D printing plastics. Metal rods may beneficially be used in 3D printing of metals, the rods being, for example, several centimeters in length with a diameter of only a few millimeters. As such, the pressure to overcome extrusion forces due to the diameter change may be quite large, as disclosed above. Further, ever-improving print quality demands features and parts with fine layer heights, and, as such, an increase in extrusion force while maintaining and decreasing the time used to print a complete part may be useful.

The roller-type extrusion design, disclosed above, may be considered insufficient to meet current and future performance demands since such pressure may deform the material within such a design. Thus, an improved means of actuation is useful in order to deliver the thermoplastic material or metal feedstock to the printed part at a desired (i.e., target) speed and consistency. According to an example embodiment for build material actuation, media may be pushed and/or gripped and pushed in a manner such that there is no relative motion between an actuator and a point of contact on the feedstock, that is, the media.

Described herein are devices, systems, and methods related to 3D printing, where a design, such as a computer-aided drafting (CAD) file, is provided to a computer operably connected to a 3D printing system, such as a 3D metal printing system, and the 3D object represented by the design may be manufactured in a layer-by-layer fashion by the 3D printing system. In general, the following disclosure may emphasize 3D printing using metal as a build material for forming a 3D object. More specifically, the disclosure may emphasize metal 3D printing systems that may deposit metal, metal alloys, or other metallic compositions for forming a 3D object using fused filament fabrication or similar techniques.

FIG. 1 is a block diagram of an example embodiment of a three-dimensional (3D) printing system 100, that is, an additive manufacturing system. The 3D system 100 may, for example, be a metallic printing system that employs fused filament fabrication. The 3D printing system 100 may use metal build material, such as a metallic alloy or bulk metallic glass. However, the 3D printing system 100 may also or instead be used with other build materials including plastics, ceramics, and the like, as well as combinations of the foregoing.

In general, the 3D printing system 100 may deposit a metal, metal alloy, metal composite or the like, using fused filament fabrication. The 3D printing system 100 includes an extrusion assembly 106 configured to receive build material 104 that is propelled by an actuation assembly 108 into an extrusion head 112 and heated to a workable state by heat 116 generated by a heater 114, and then extruded through one or more nozzle(s) 113 to produce the workable build material 122. It should be understood that the heater 114 is an example for generating the heat 116 and that the heat 116 may be generated in any suitable way, such as via friction of the build material 104 interacting with the extrusion assembly 106. By concurrently controlling robotics (not shown) to position the nozzle(s) 113 along an extrusion path relative to a build plate 120, a 3D object 110 may be fabricated on the build plate 120 within, for example, a build chamber (not shown), the build chamber housing any suitable combination of devices or systems of the 3D printing system 100.

In general, a controller 118 may be configured to manage operation of the 3D printing system 100 to fabricate the 3D object 110 according to a 3D model using a fused filament fabrication process or the like. The controller 118 may be remote or local to the 3D printing system 100 and may be a centralized or distributed system. The controller 118 may be configured to generate control signals, such as the feeder control signal(s) 103a that may control a feeder assembly 102 to dispense the build material 104 or the extrusion control signal(s) 103b that may control the extrusion assembly 106 or elements included therein, such as the actuation assembly 108, heater 114, extrusion head 112, nozzle(s) 113, or any other suitable device or system for use in managing the 3D printing process.

Further, the controller 118 may receive status, such as the feeder assembly status 105a or extrusion status 105b, received from the feeder assembly 102 and the extrusion assembly 106, respectively, or any other suitable status signal(s) from any other suitable device or system for use in managing the 3D printing process.

As disclosed above, an improved means of actuation is useful in order to deliver the build material 105, that may be a thermoplastic material or metal feedstock, to the printed part, that is, the 3D object 100 at a desired (i.e., target) speed and consistency. As such, the 3D actuation assembly 108 has improved build material actuation, for example, relative to the roller-type design, disclosed above.

A linear actuator is an actuator that creates motion in a straight line, in contrast to circular motion of a conventional electric motor. Linear actuators are used in machine tools and industrial machinery, in computer peripherals such as disk drives and printers, in valves and dampers, and in many other places where linear motion is useful. Hydraulic or pneumatic cylinders inherently produce linear motion. Many other mechanisms may be used to generate linear motion from a rotating motor.

Typically, a roller-type design of drive gears engage the media and convert circular motion of the gears into a linear translation of the feedstock, such as the build material 104 of FIG. 1, disclosed above. A chief downside to employing a roller-type design for the drive gear is the limited engagement area of the actuator with the feedstock. To resolve this, an example embodiment of the actuation assembly 108 may employ linear actuation to push, and/or grip and push the build material 104, such that there is no relative motion between the actuator and a point of contact on the feedstock. Further, an example embodiment may enable reloading such that extrusion can operate semi-continuously and without manual reloading and resetting operations. An example embodiment may move a rod of build material, that is, a discrete element of the build material 104, in the 3D printing system 100 using a pusher, such as the pusher 242 of FIG. 2A, disclosed below.

Figure 2A:
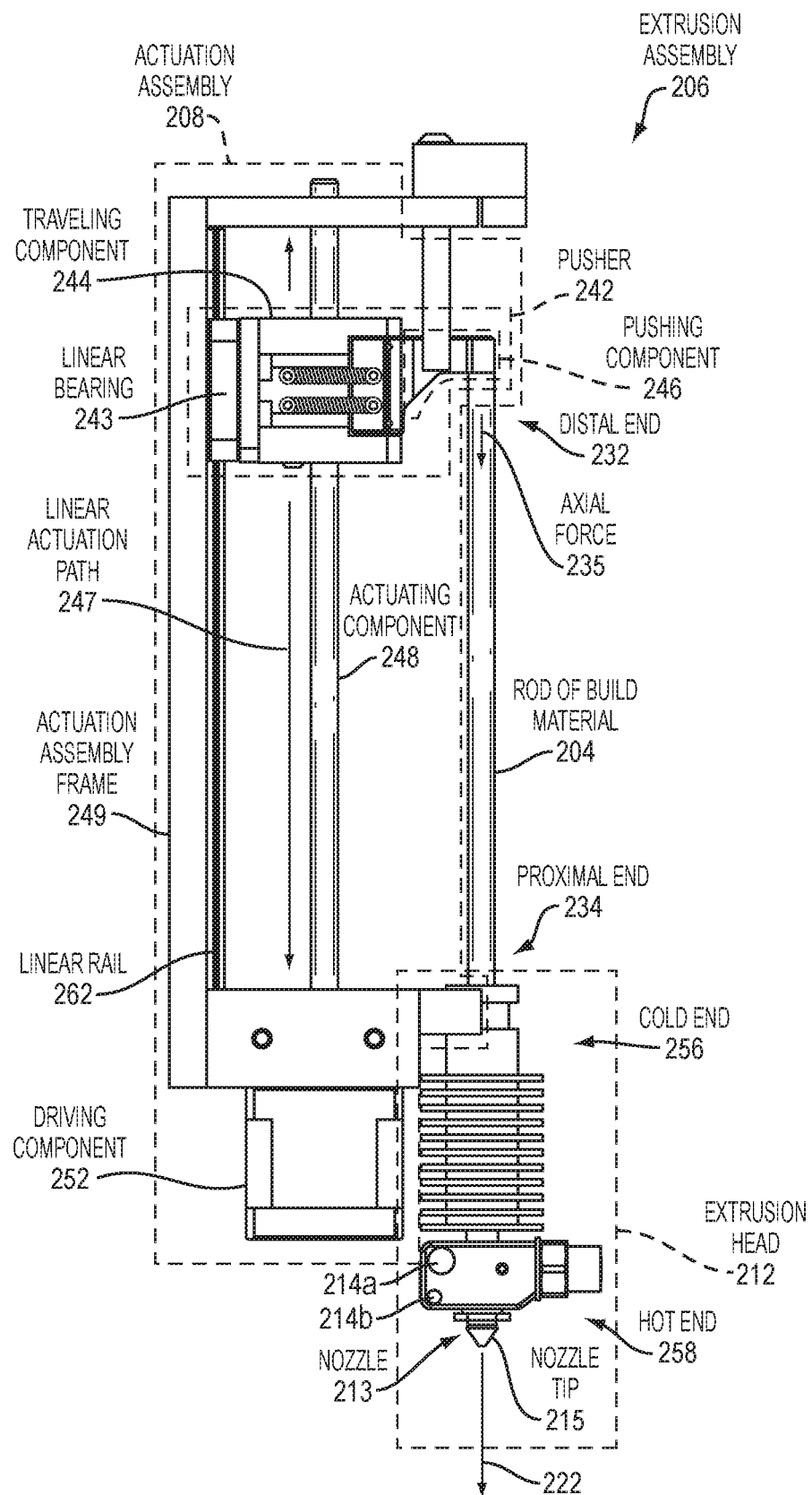
FIG. 2A is computer-aided design (CAD) drawing of an extrusion assembly for use in a 3D printing system.

FIG. 2A is a computer-aided design (CAD) drawing of an extrusion assembly 206 for use in a 3D printing system, such as the 3D printing system 100 of FIG. 1, disclosed above. The extrusion assembly 206 includes an extrusion head 212 configured to receive a rod of build material 204 having distal and proximal ends relative to the extrusion head 212, that is, the distal end 232 and the proximal end 234. The distal and proximal ends having distal and proximal end surfaces, respectively, such as the distal end surface 233 and the proximal end surface 231. The extrusion assembly 206 includes an actuation assembly 208 that includes the pusher 242. The pusher 242 is arranged to apply an axial force 235 to at least a portion of the distal end surface of the distal end 232 of the rod of build material 204. The axial force 235 is applied to the at least a portion of the distal end surface for at least a portion of a path the rod travels toward the extrusion head 212. According to an example embodiment, the distal end surface may be a normal surface or feature that is normal relative to a longitudinal axis of the rod of build material. The at least a portion of the path may be a portion of an extrusion path, such as the extrusion path 238 disclosed below with regard to FIG. 2J. The axial force 235 actuates the rod of build material without alteration, such as by shaving, fracturing, or otherwise deforming the rod of build material 204. The axial force 235 is sufficient to overcome extrusion forces due to a diameter change between the rod of build material 204 and the nozzle tip 215 of the nozzle 213.

The extrusion head 212 includes a cold end 256 and a hot end 258. According to the example embodiment, the extrusion assembly 206 includes heating elements 214a and 214b that may be configured to generate heat to transform the rod of build material 204 to the workable build material 222.

The actuation assembly 208 may further include an actuating component 248 coupled to the pusher 242 and a driving component 252 coupled to the actuating component 248. The driving component 252 may be configured to drive the actuating component 248 in a manner that causes bi-directional linear motion of the pusher 242 relative to the extrusion head 212. The axial force 235 may be applied as a function of the pusher 242 being caused to move, linearly, toward the extrusion head 212.

According to an example embodiment, the actuating component 248 may be a lead screw and the driving component 252 may be a motor. However, the actuation component 248 may be any suitable actuating component that may be driven to cause the pusher 242 to move in a bi-directional motion relative to the extrusion head 212. Further, the driving component 252 need not be a motor and may be any suitable mechanical, pneumatic, electro-mechanical, magnetic, or other type of driving component for driving the actuating component 248 to cause linear motion of the pusher 242.

The pusher 242 includes a traveling component 244 and a pushing component 246. The pushing component 246 may be arranged to be a rigid body of the traveling component 244 to form the pusher 242. The traveling component 244 is arranged to travel, linearly, along a linear actuation path 247 defined by the actuating component 248, to cause linear motion of the pushing component 246.

The pusher 242 may include a pusher interface (not shown). The pusher interface may be arranged to engage with the at least a portion of the distal end surface, such as the pusher interface 359 of FIG. 3D, disclosed further below. The pusher interface may include complementary features relative to surface features of the at least a portion of the distal end surface of the rod of build material 204. For example, in an event the at least a portion of the distal end surface is flat, the pusher interface may have a complementary feature, that is, a flat surface. It should be understood that a flat surface is one example of a surface feature and that the at least a portion of the distal end surface of the rod of build material 204 may have any suitable surface features and that pusher interface may include complementary features that complement and correspond to such surface features.

According to an example embodiment, the pushing component 242 may include at least one cantilevered protrusion of the traveling component 244, such as the pushing component 242, that is, a cantilevered protrusion in the example embodiment.

The pusher 242 may include a traveling component 244 arranged to cause motion of the pusher 242. According to an example embodiment, the traveling component 244 may include a nut, such as the nut 245 of FIG. 2E, disclosed further below.

According to an example embodiment, a linear guide, such as the linear rail 262, may be coupled to the traveling component 244 via a linear bearing 243. The linear bearing 243 may be any suitable linear bearing, such as a bushing or a ball bearing. The linear bearing 243 may be arranged to roll along the linear rail 262. The linear rail 262 may be coupled to an actuation assembly frame 249 of the actuation assembly 208. The linear bearing 243, in combination with the linear rail 262, may be arranged to guide the traveling component 244 as the traveling component 244 travels along the actuating component 248 and relieve a load otherwise applied to the actuating component 248 due to the axial force 235 applied to the rod of build material 204 by the pushing component 246. It should be understood that the linear guide need not be a linear rail and may be any other suitable linear guide.

FIG. 2B is a block diagram of an example embodiment of a distal end surface 233 of the rod of build material 204 and the axial force 235. As disclosed above with regard to FIG. 2A, the axial force 235 may be applied to at least a portion of the distal end surface 233. According to an example embodiment, the axial force 235 may be applied along an axis that is substantially parallel to a longitudinal axis 236 that runs lengthwise along a length 237 of the build material 204. It should be understood that a shape of the rod of build material 204 may be of any suitable shape, such as illustrated in FIG. 2C, disclosed below, or any other suitable shape, and that the distal end surface 233 may have any suitable surface features.

FIG. 2C is a block diagram of another example embodiment of a cross-sectional surface 233 of the rod of build material 204 and the axial force 235.

FIG. 2D is a block diagram of an example embodiment of a 3D coordinate system and the axial force 235. The axial force 235 is substantially parallel to the z-axis 238 and is in a direction toward the extrusion head 212.

Figure 2E:
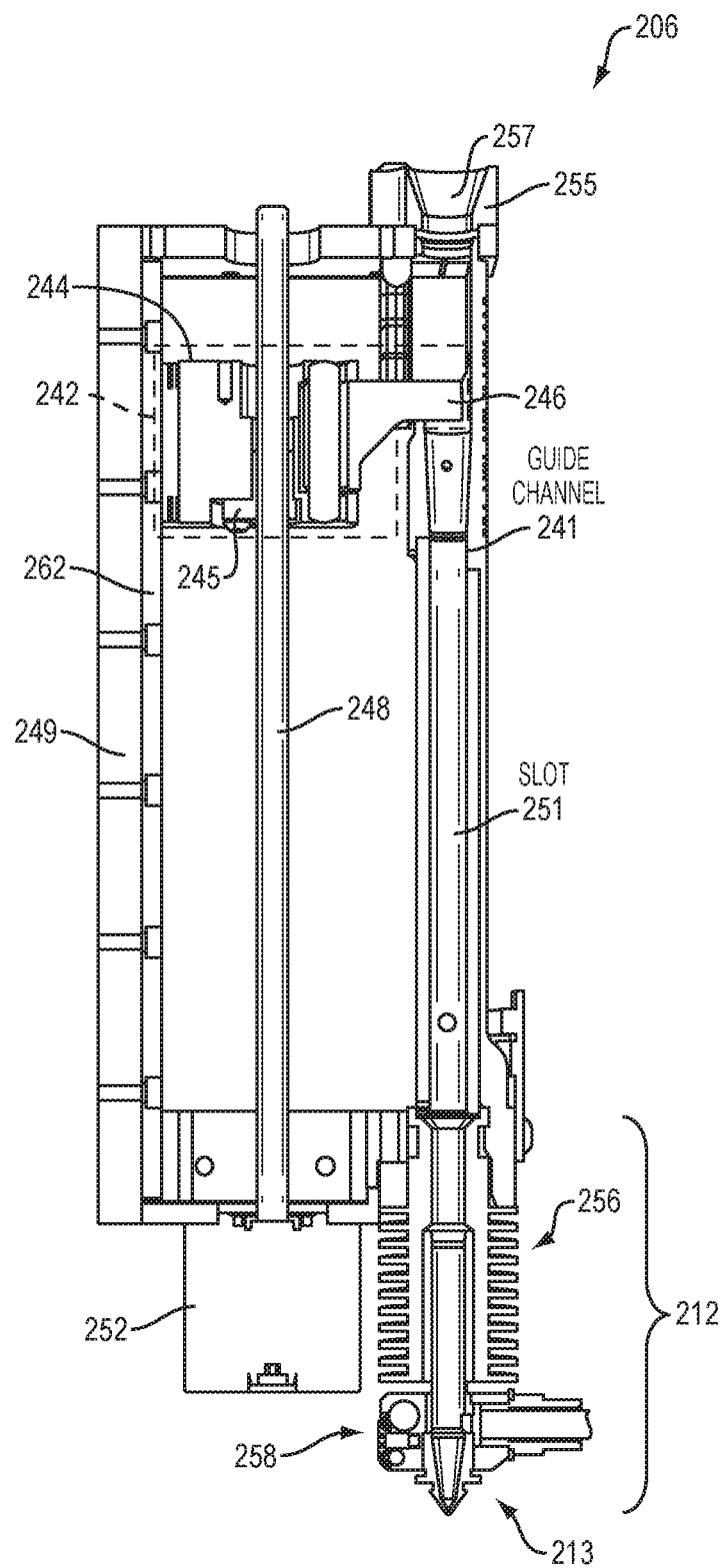
FIG. 2E is a CAD drawing of a cross-sectional view of an example embodiment of the extrusion assembly of FIG. 2A.

FIG. 2E is a CAD drawing of a cross-sectional view of an example embodiment of the extrusion assembly 206 of FIG. 2A, disclosed above. According to the example embodiment, the actuating component 246 may be a lead screw and the traveling component 244 may include a nut 245 coupled to the lead screw. The nut 245 coupled to the lead screw may be referred to interchangeably herein as a lead screw nut. Further, the lead screw may be referred to as an actuating component or a linear actuating component.

In operation, as the driving component 252 drives the actuating component 246, the actuating component 246 is caused to rotate which, in turn, causes the traveling component 244 to move in a linear direction resulting in linear motion of the pushing component 246. With the pushing component 246 positioned in the slot 251, rotation of the nut 245 relative to the lead screw, that is, the actuating component 246, is prevented, in the example embodiment.

Figure 2F:
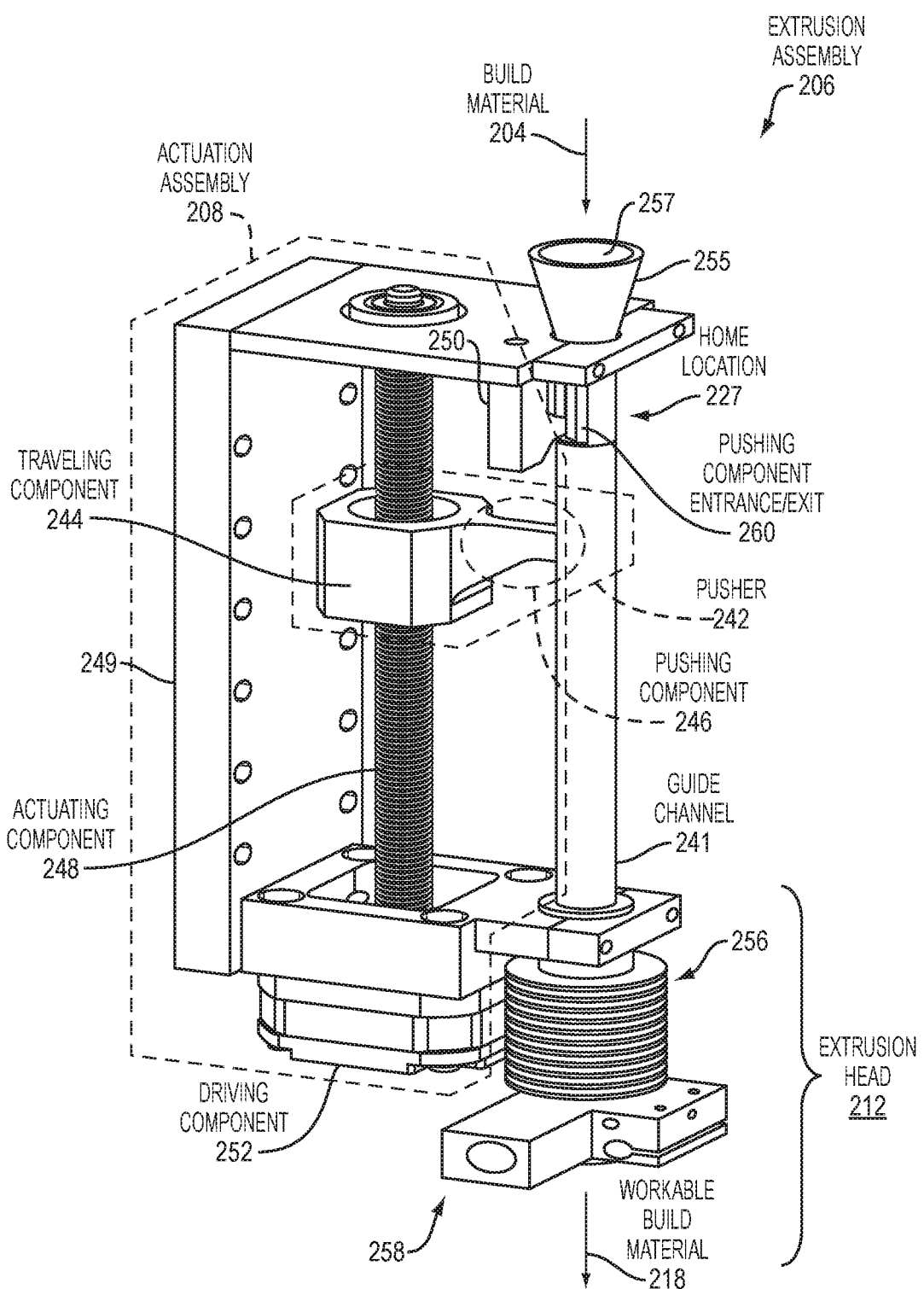
FIG. 2F is a CAD drawing of another example embodiment of the extrusion assembly of FIG. 2A.

According to the example embodiment, the extrusion assembly 206 may further comprise a guide channel 241 (e.g., alignment device) that defines at least one slot, such as the slot 251. The guide channel 241 may have a same length as a length of the rod of build material 204 or may have a different length. In the example embodiment, the guide channel 241 has a tubular structure, however, the guide channel 241 may have any suitable shape for guiding the rod of build material 204. The guide channel 241 may be employed to prevent buckling of the build material 204. The guide channel 241 may or may not run a full length of the rod of build material 204. The extrusion assembly 206 may include a media loading component 255 that defines an entrance 257 for the rod of build material 204. In the example embodiment, the rod of build material 204 is not present. According to an example embodiment, the media loading component 255 may have a funnel shape, such as shown in FIG. 2F, disclosed below. However, it should be understood that the media loading component 255 need not have the funnel shape and may have any suitable shape for directing the rod of build material 204 into the extrusion assembly 206.

The at least a portion of the path the rod travels toward the extrusion head 212 may be defined, in part, by the guide channel 241. The slot 251 may be configured to receive the pushing component 246. The guide channel 241 may be arranged to contact at least a portion of the rod of build material to provide alignment for the at least a portion of the rod.

FIG. 2F is a CAD drawing of another example embodiment of the extrusion assembly 206 of FIG. 2A, disclosed above. In the example embodiment, the actuating component 248 is a lead screw and the linear rail bearing 243 and linear rail 262 are not employed. The extrusion assembly 206 includes the guide channel 241 that defines the slot 251, disclosed above with regard to FIG. 2E. The actuation assembly 208 further includes a cam 250 arranged at a home location 227 for the pusher 242 to guide the pushing component 242 out of the way of a path the rod of build material 204 travels toward the extrusion head 212 and moves the pushing component 246 into a media load position 263, as disclosed below with regard to FIG. 2G. The cam 250 may be any suitable component that is arranged to cause movement of another component that it comes into contact.

For example, the cam 250 may be arranged to cause the pushing component 246 to exit the slot 251 of the guide channel 241 via the pushing component entrance/exit 260. Following loading of the build material 204 into the extrusion assembly 206, the driving component 258 may drive the actuation component to cause the pusher 242 to move downward in a direction toward the extrusion head 212 and the cam 250 may be arranged to guide the pushing component 246 back into the slot 251 and above the distal end 232 of the rod of build material 204, positioning the pushing component 246 in an extrude position, such as disclosed below with regard to FIG. 2H. The driving component 252 may drive the actuating component to cause the pusher 242 to travel and the pushing component 246 to apply the axial force 235, as disclosed above with regard to FIG. 2A.

Figure 2H:
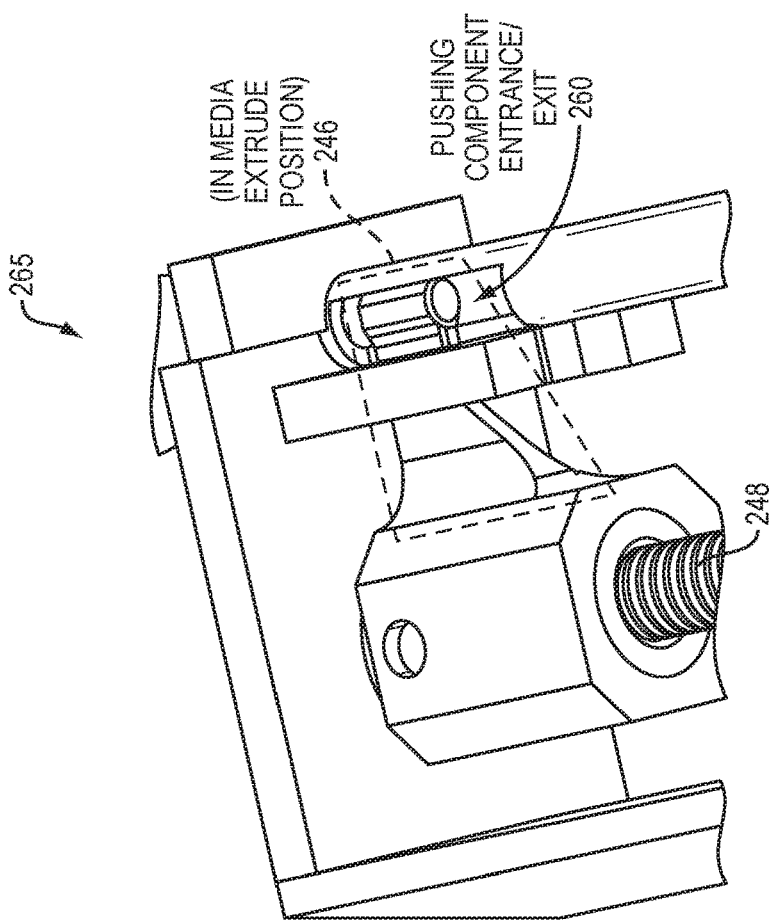
FIG. 2H is a CAD drawing of an example embodiment of the pushing component of FIG. 2F in an active position for extruding media.
Figure 2G:
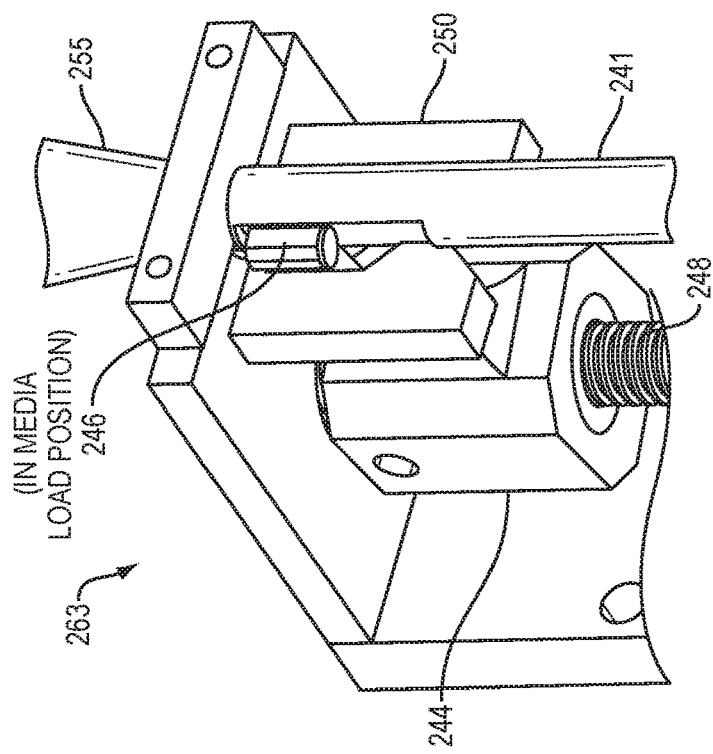
FIG. 2G is a CAD drawing of an example embodiment of the pushing component of FIG. 2F in a passive position to enable media loading.
Figure 21:
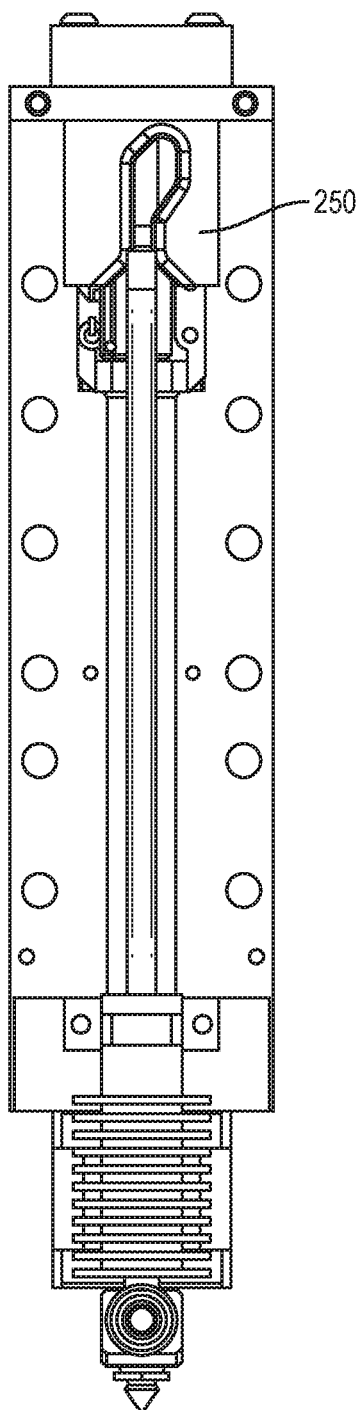

FIG. 2G is a CAD drawing of an example embodiment of the pushing component 246 of FIG. 2F in a passive position to enable media loading.

FIG. 2H is a CAD drawing of an example embodiment of the pushing component 246 of FIG. 2F in an active position for extruding media, that is, the media extrude position 265.

FIG. 2I is a CAD drawing of a cross-sectional view of an example embodiment of the cam 250 of FIG. 2F, disclosed above. As illustrated in FIG. 2G and FIG. 2H, the cam 250 may be arranged to cause the pushing component 246 to transition between a media load position and a media extrude position as a function of surface contact between the cam 250 and the pushing component 246. In the media load position, the pushing component may be arranged to be out of the path the rod travels toward the extrusion head. In the media extrude position, at least a portion of the pushing component may be arranged to be in the path the rod travels toward the extrusion head.

Figure 2J:
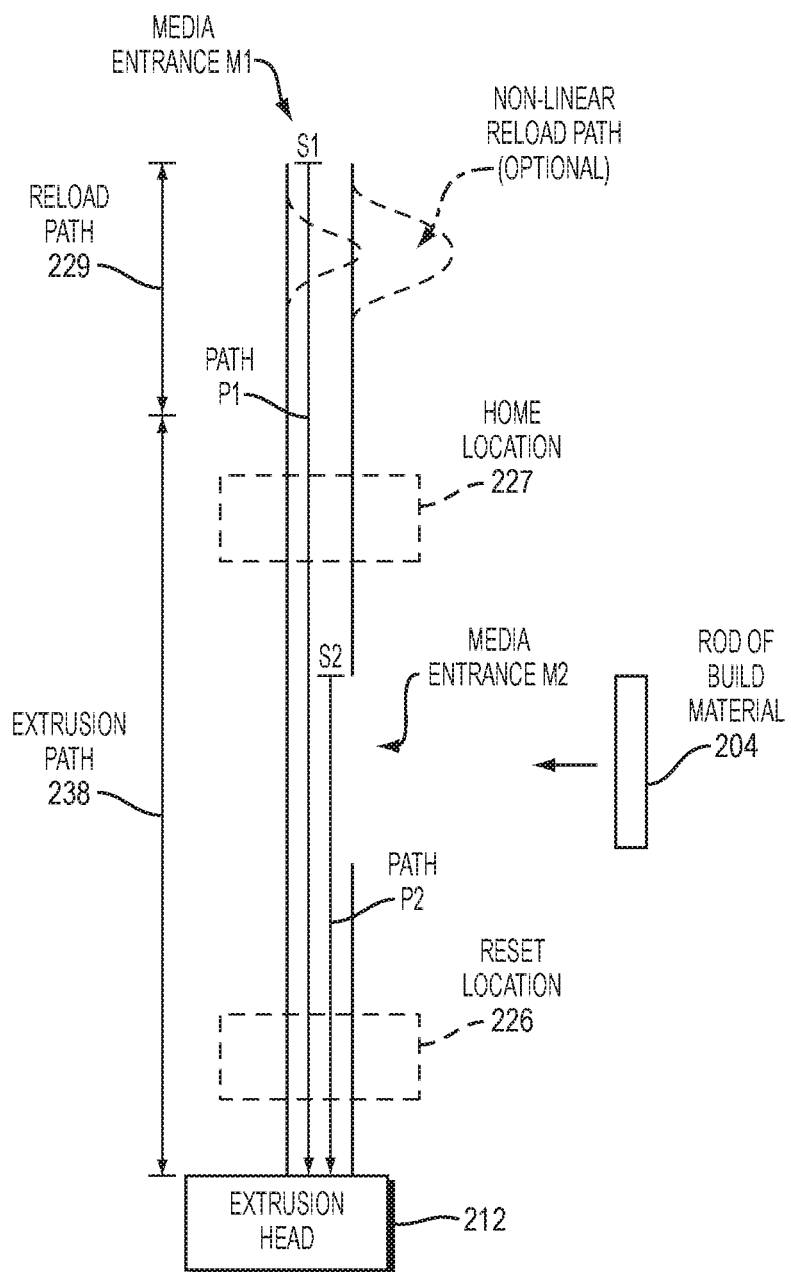
FIG. 2J is a block diagram of an example embodiment of a path a rod of build material travels toward the extrusion head.

FIG. 2J is a block diagram of an example embodiment of a path the rod of build material 204 may travel toward the extrusion head 212. According to an example embodiment, the extrusion assembly may include a media entrance arranged to load the rod of build material into the extrusion assembly. The path the rod travels toward the extrusion head may be from the media entrance to the extrusion head. For example, the rod of build material may enter a media entrance of the extrusion assembly, such as the media entrance M1 or the media entrance M2 in any suitable way and travel from a starting location, such as S1 or S2, at the respective media entrance to reach the extrusion head 212. The rod of build material 204 may enter along any axis and may be positioned into a reload path 229 or directly into the extrusion path 238. Positioning of the pushing component 246 in either of the media reload position or media extrude position, such as disclosed above with regard to FIG. 2G and FIG. 2H, may be based on the home location 227 of the pusher 242. The home location 227 may be a location of the extrusion assembly where the pusher 242 dwells during non-extrusion.

The rod of build material 204 may enter at the media entrance M1 and travel the path P1 to reach the extrusion head 212. As such, the pushing component 246 may be positioned in the media load position 263 when the pusher 242 is at the home location 327 so as not to block or hinder the path P1. Alternatively, the home location 227 may be such that the pushing component 246 may remain in the media extrude position 265 during media loading. For example, the home location 227 may be above the media entrance, such as the media entrance M2. As such, the pushing component 246 may overlap the extrusion path 238 as media is loaded from the media entrance M2, since the pushing component 246 would not overlap the path P2 traveled by the rod of build material to reach the extrusion head 212 from the starting location S2 at the media entrance M2.

It should be understood that while the reload path 229 is shown in FIG. 2J as linear, the reload path 229 may include paths that are linear, non-linear, or a combination thereof, as illustrated. According to an example embodiment, the extrusion path 238 may be substantially linear. The reload path 229 may be referred to interchangeably herein as a load path.

In operation, following loading of the rod of build material 204, the driving component 252 may be configured to drive the actuating component 248 in a first direction to cause the pusher 242 to move from the home location 227 and move the rod of build material toward the extrusion head 212. The driving component may be configured to drive the actuating component such that the actuating component is driven in a reverse direction in an event the pusher 242 moves to the reset location 226 that is closer to the extrusion head relative to the home location 227. The reset location 226 may or may not be at the extrusion head 212.

Turning back to FIG. 2E, the driving component 252 may be an electric motor (with or without gearbox) that may be set in-line with the actuating component 248, that is a lead screw in the example embodiment, to which a traveling component 244, such as a nut, may be attached. The nut, that is, the traveling component 244 has a cantilevered protrusion in the example embodiment, that is, the pushing component 246, which can be driven to contact and drive the feedstock, that is, a rod of build material, into the hotend 258 of the liquefying extruder, that is, the extrusion head 212.

The pusher 242 may have a piston-like motion of the actuation assembly 208, that drives a rod of build material into the hotend 258. In addition, it may be useful to control an offset between the driving component 252, that may be a motor, and the media being driven into the hotend 258 in order to control a time response of the extrusion assembly 206. The motor may be positioned as shown in the present orientation or in an alternate configuration opposite the hotend 258 (e.g., mirror about the assembly height). A pitch of the lead screw, that is, the actuating component 248, may be controlled to control the ability to finely-tune the material flow through the hotend 258. A diameter and material of the lead screw, that is, the actuating component 248, affects stiffness of the extrusion assembly system 206. By making the diameter larger, the stiffness may be increased. By selecting a material with a larger Young's modulus, the stiffness may be increased.

Turning back to FIG. 2F, according to an example embodiment of the extrusion assembly 206, the actuation assembly 208 may include the guide channel 241, that may be a tube which confines the media and may prevent the media from buckling; a funnel 255 which directs the media as it is inserted into the confining tube 241; a nut 244 with an appendage 246 to push the media into the hotend 258; and a slot 260 in the confining tube 241 which permits the nut 244 to rotate out of the way of the confining tube 241 when a new rod is to be loaded, as shown in FIG. 2G, disclosed above. In FIG. 2G, the nut 244 is rotated into the confining tube 241 to push the media.

According to an example embodiment, a rod of the build material may also be cooled actively or passively in the guide channel 241. The guide channel 241 may also be outfitted with sensors to indicate the absolute or relative positions of the rod. The nut 244 with appendage 246 configured to push the media can also be combined with a strain gage to indicate a force on the media. According to a further example embodiment, the nut 244 with appendage 264 in combination form the pusher 242 to push the media and may be combined with a miniature load cell to indicate a force on the media. The pushing component 246 as an appendage may be referred to interchangeably herein as a finger.

Figure 3A:
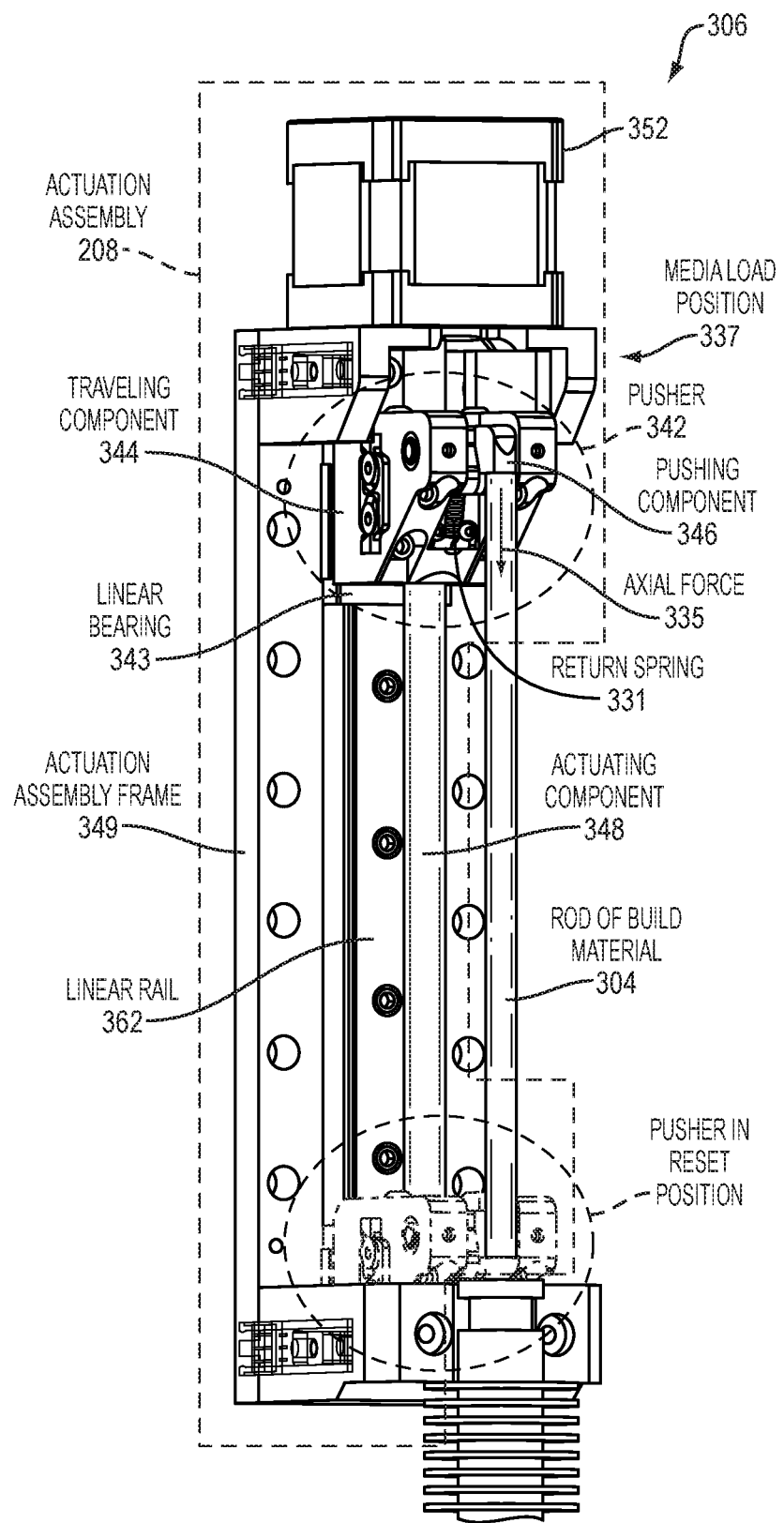
FIG. 3A is a CAD drawing of an example embodiment of a portion of an extrusion assembly.

FIG. 3A is a CAD drawing of an example embodiment of a portion of an extrusion assembly 306. The actuation assembly 306 includes a pusher 342 that includes a traveling component 344 and a pushing component 346. The pushing component 346 is arranged to apply an axial force 335 to a rod of build material 304, such as disclosed above with regard to FIG. 2A. The actuation assembly includes a linear rail 362 coupled to a frame 349 of the actuation assembly 208 and a linear bearing 343 arranged to couple the traveling component 344 to the linear rail 362. The linear rail 362 in combination with the linear bearing 343 may be arranged to guide the traveling component 344 as the traveling component 344 travels along the actuating component 348 and relieve (e.g., absorb) a load, such as an axial load, otherwise applied to the actuating component 348 due to the axial force 335 applied to the rod of build material 304 by the pushing component 346, as disclosed above with regard to FIG. 2A. The pusher 342 may include a return spring 331 that may be arranged to maintain pushing of the pushing component 346 relative to the traveling component 344 and prevent rotation of the pushing component 346.

Figure 3B:
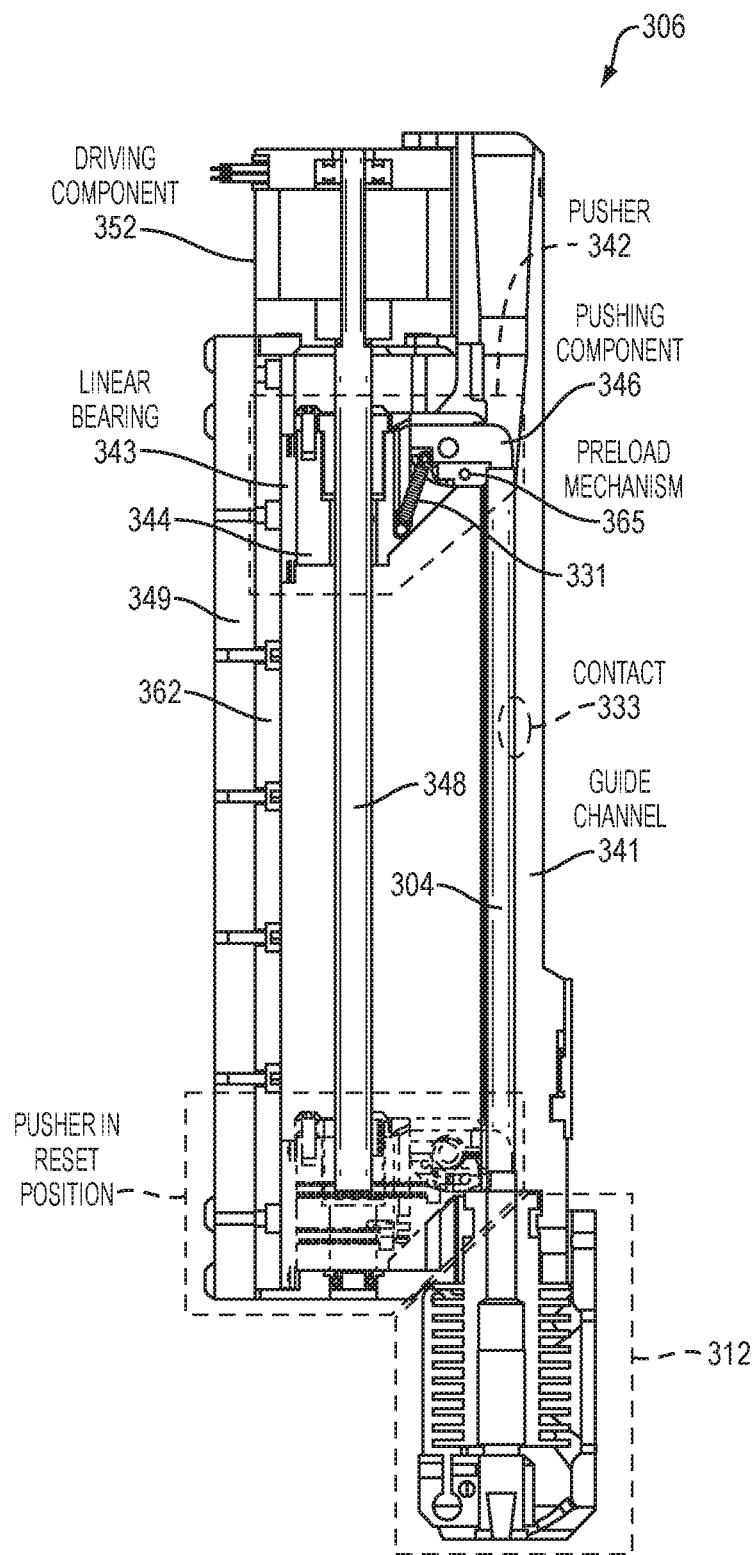
FIG. 3B is a CAD drawing of a cross-sectional view of the example embodiment of FIG. 3A, disclosed above, that includes a guide channel.

FIG. 3B is a CAD drawing of an isometric view of the example embodiment of FIG. 3A, disclosed above, that includes a guide tube 341. In the example embodiment, there is contact 333 between the guide tube 341 and the rod of build material 304. As such, the guide tube 341 is advantageously arranged to maintain an alignment of the rod of build material 304 as the rod travels toward the extrusion head 312, in addition to preventing buckling. The actuating component 348 may be a lead screw, as disclosed above with regard to the extrusion assembly 206, that may be driven by the driving component 352. The actuation assembly includes the linear rail 362 coupled to the frame 349 of the actuation assembly 208 and the linear bearing 343 arranged to couple the traveling component 344 to the linear rail 362. The pusher includes a return spring 331, as disclosed in FIG. 3C, below.

Figure 3C:
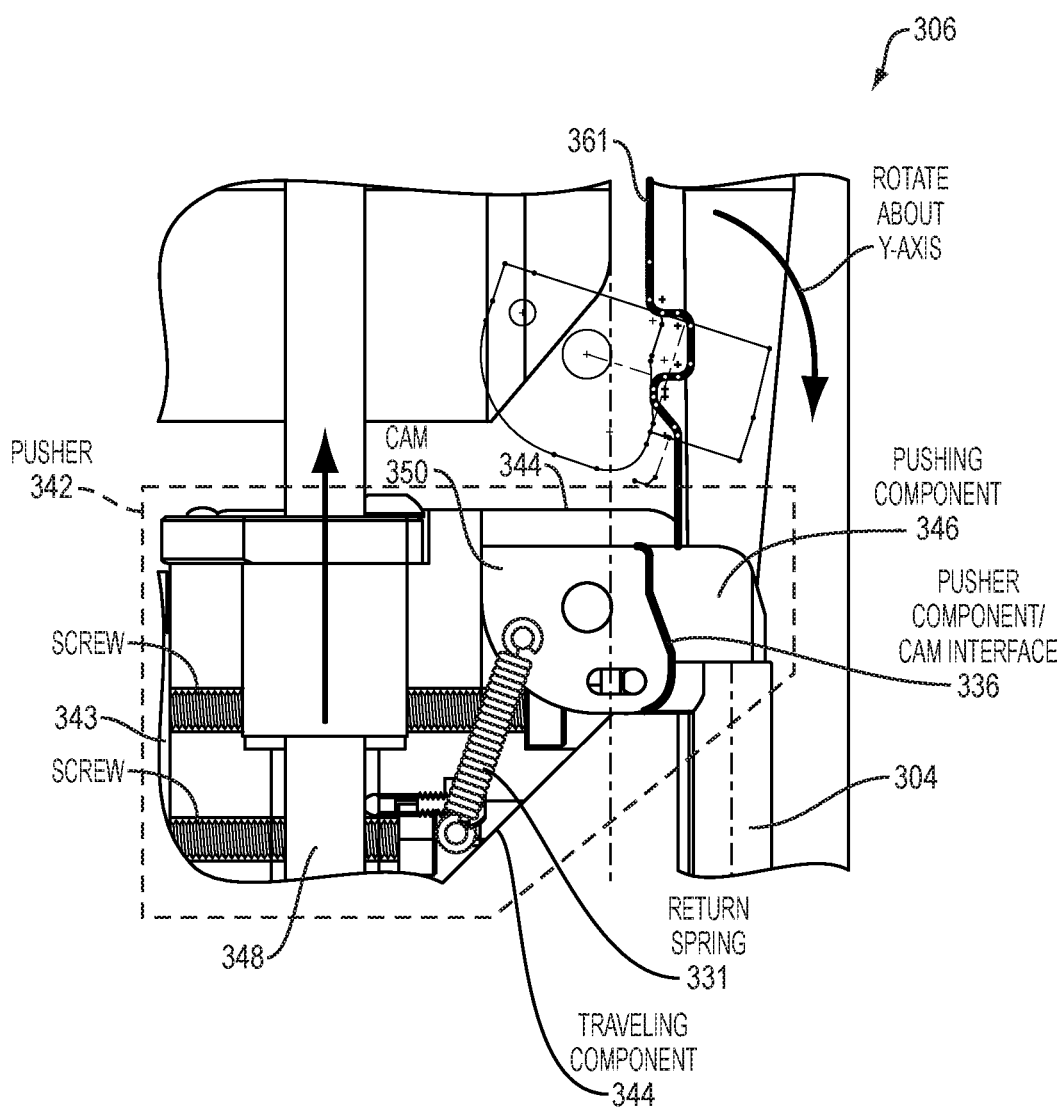
FIG. 3C is a CAD drawing of an isometric view of the pusher of FIG. 3A disclosed above.

FIG. 3C is a CAD drawing of an isometric view of the pusher 342 of FIG. 3A, disclosed above. The pusher 342 includes a cam 350 that is coupled to the traveling component 344 via a return spring 331 that may also be referred to herein as a retract spring. The return spring 331 enables the pushing component 346 to be maintained as a rigid body within the traveling component. The pushing component 346 is coupled to the cam 350 at the pusher component/cam interface 336. In the example embodiment, in operation, as the pusher 342 returns to a reload position, such as the media load position 337, disclosed above, the pusher component/cam interface 336 makes contact with the guide channel retract cam 361 and the pushing component 336 rotates downward about the y-axis, such as the y-axis 239 of FIG. 2D, disclosed above, as the pusher 342 is moving in an upwards direction, that is, in the −z-axis direction 264 of FIG. 2D. As such, another rod of the build material 304 may be loaded into the extrusion assembly 306.

Figure 3D:
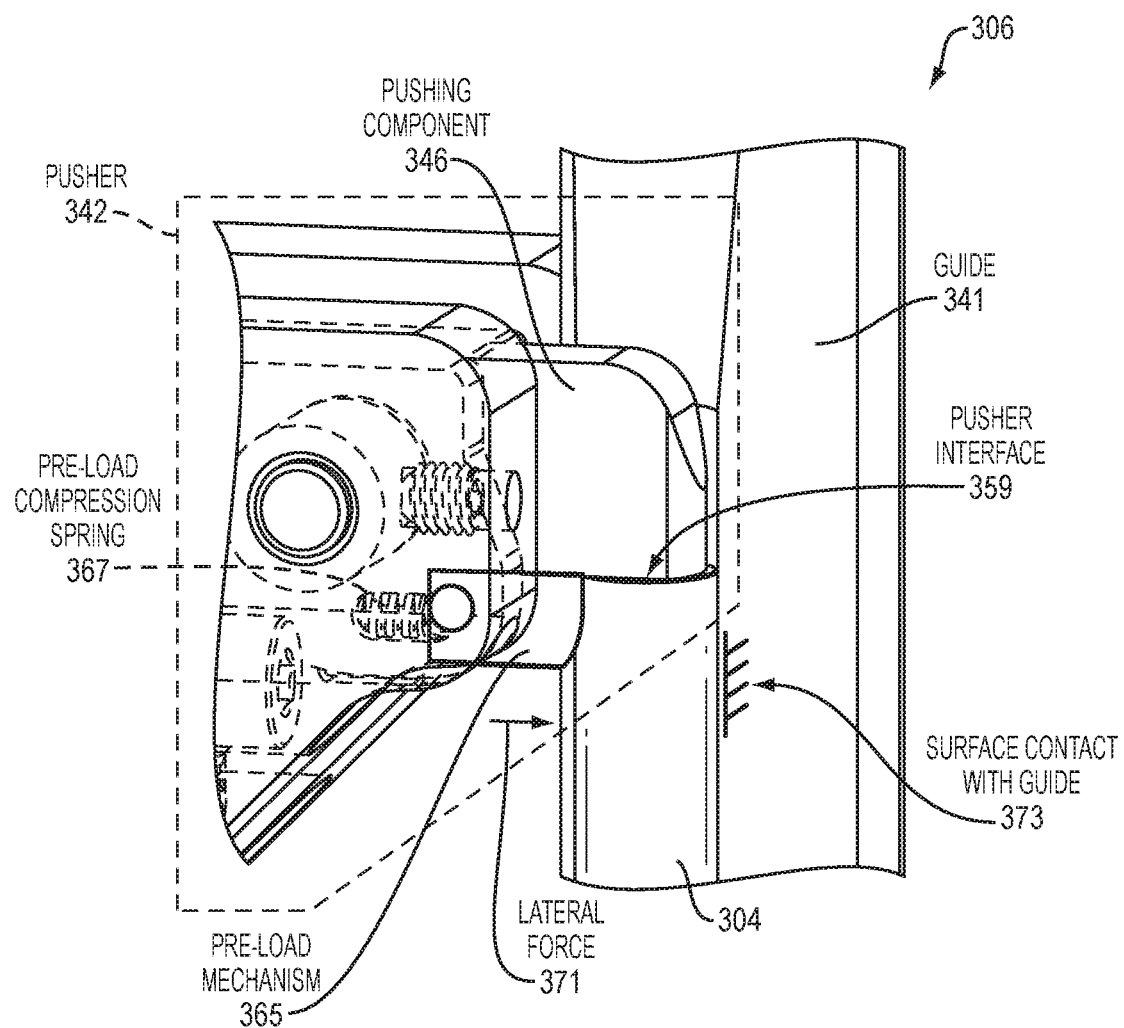
FIG. 3D is a CAD drawing of another isometric view of the pusher of FIG. 3A disclosed above.

FIG. 3D is a CAD drawing of another isometric view of another example embodiment of the pusher 342 of FIG. 3A, disclosed above. In the example embodiment, the pusher 342 includes a preload mechanism 365 and a pre-load compression spring 367. The pre-load mechanism 365 may be formed of plastic or any other suitable material and is configured to abut a surface of the build material 304 and apply a lateral force 371 that works in combination with surface contact 373 of the build material 304 with a surface of the guide channel 341 to align the rod of build material 304. The pre-load compression spring 367 may be configured to bias the pre-load mechanism 365.

Figure 4A:
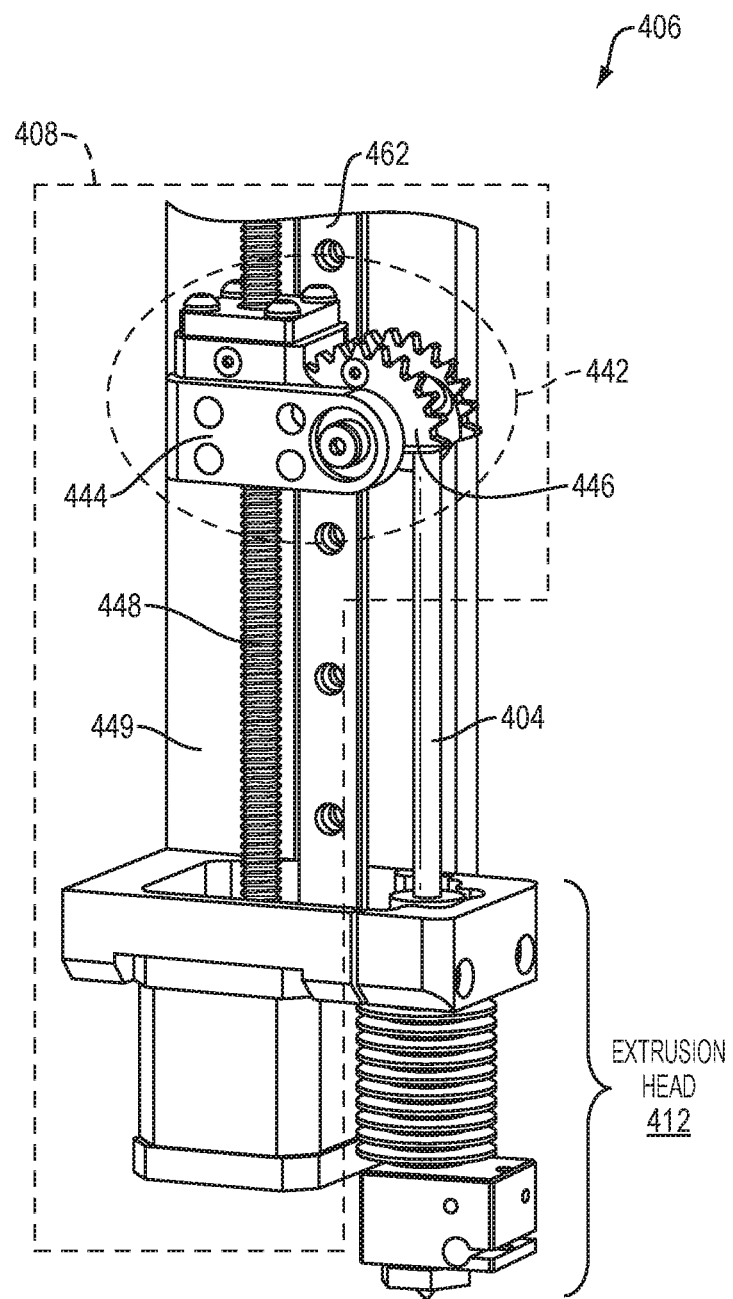
FIG. 4A is an isometric view of an example embodiment of an actuation assembly that includes a linear rail and geared flipper.

FIG. 4A is a CAD drawing of an isometric view of an example embodiment of an extrusion assembly 406 that includes a linear rail (not visible) and a pushing component 446 with gears that is configured to pivot about the y-axis. The pushing component 446 may be referred to interchangeably herein as a geared flipper. The extrusion assembly 406 includes a linear rail 462 coupled to an actuation assembly frame 449 of the actuation assembly 408. The linear rail 462 may be coupled to the traveling component 444 via the linear bearing 443. The linear bearing may be arranged to roll along the linear rail 462. The linear bearing may locate the pusher 442 along the linear rail 462. The stiffness of the pusher 442 may be higher relative to a stiffness of the pusher 242, disclosed above. Enhancing the stiffness may be useful to reduce an amount of unwanted flow from the extrusion assembly 406, and also to minimize a delay in time between an instant in which a flow rate command is sent and when the flowrate is realized at the nozzle tip.

Further, the traveling component 444 may be a nut on the actuating component 448 and the nut is confined not to rotate relative to the actuation component 448 that may be a lead screw. In addition, according to an example embodiment, the nut may be anti-backlash. According to another example embodiment, the nut may be a split nut with a spring (i.e., anti-backlash nut).

Using a standard threaded nut which is cut and the two partially-separated sides either forced together or apart provides a binding action between the lead screw and nut. Further, a nut onto which an element which rotates is included. The element which rotates contains a through hole to permit the passage of the print media. In addition, the element which rotates contains an element to engage with a fixed element actuating the rotation in at least one position in the device. The element which rotates may be spring loaded to remain in a preferred orientation during operation. The element which rotates may be the pushing component 446, as disclosed above with regard to FIG. 3C.

Figure 4B:
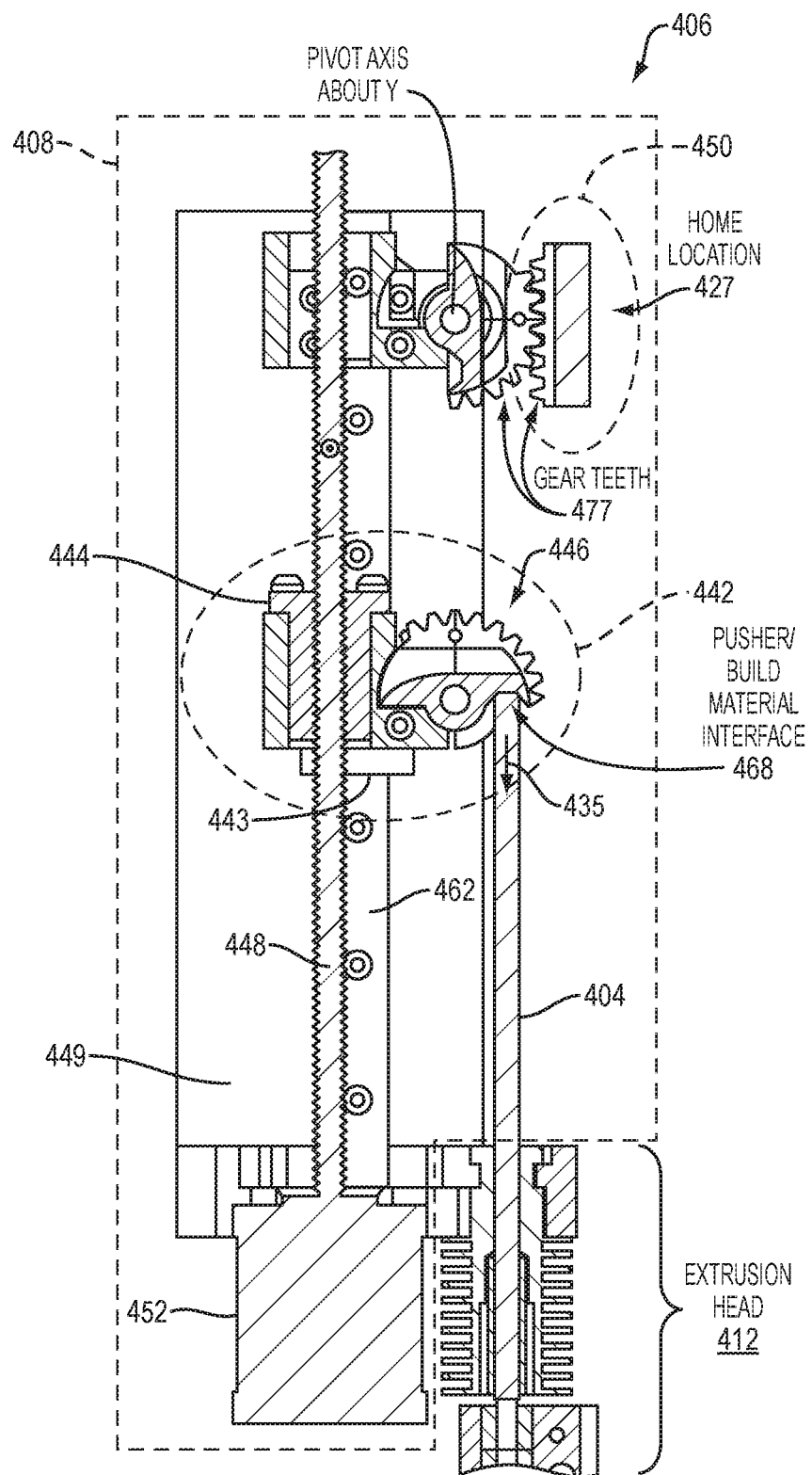
FIG. 4B is a cross sectional view of the example embodiment of the actuation assembly of FIG. 4A.

FIG. 4B is a cross sectional view of the example embodiment of the extrusion assembly 406 of FIG. 4A. The linear bearing 443 in combination with the linear rail 462 may be arranged to guide the traveling component 444 as the traveling component 444 travels along the actuating component 448 and relieves a load otherwise applied to the actuating component 448 due to the axial force 435 applied to the rod of build material 404 by the pushing component 446 at a pusher/build material interface 468. The linear bearing 443 is arranged to position the pusher 442 along the linear rail 462. The extrusion assembly 406 includes a cam 450 located at the home position 427 of the pusher 442. In the example embodiment, the cam 450 performs similar to a rack and pinion. In the example embodiment, the pushing component 446 and the cam 450 define complementary features, that is, the gear teeth 477.

Figure 5:
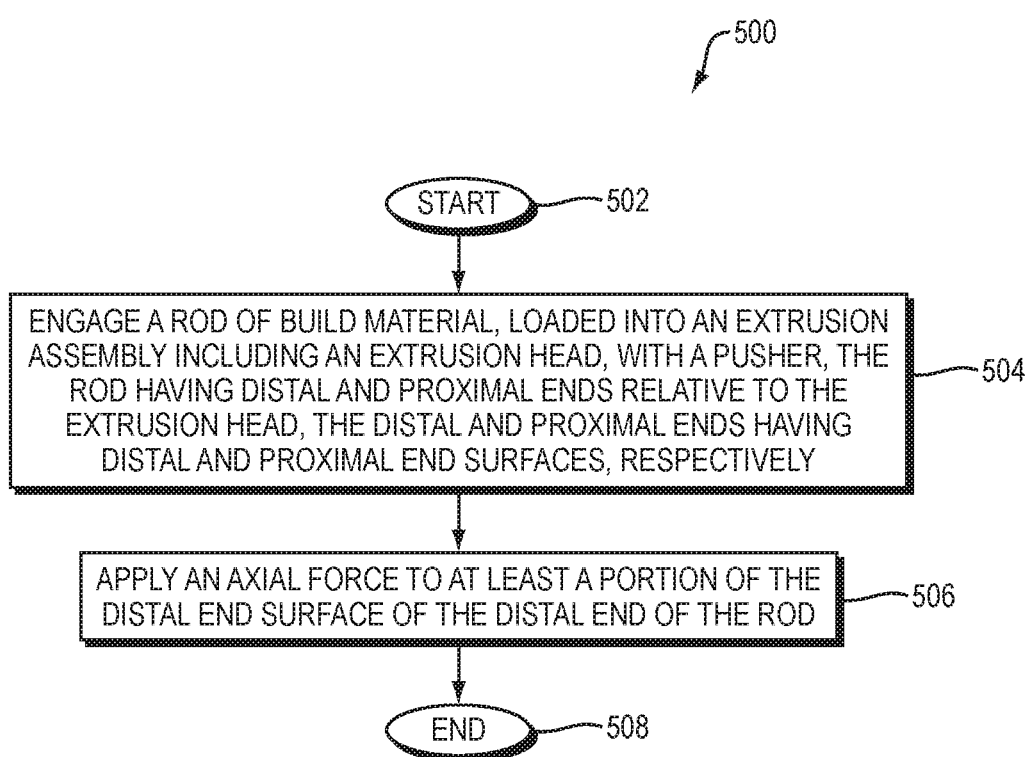
FIG. 5 is a flow diagram of an example embodiment of a method for moving a rod of build material in a three-dimensional (3D) printing system.

FIG. 5 is a flow diagram 500 of an example embodiment of a method for moving a rod of build material in a three-dimensional (3D) printing system. The method may begin (502) and engage a rod of build material, loaded into an extrusion assembly including an extrusion head, with a pusher, the rod having distal and proximal ends relative to the extrusion head, the distal and proximal ends having distal and proximal end surfaces, respectively (502). The method may apply an axial force to at least a portion of the distal end surface of the distal end of the rod, the axial force being applied, by the pusher, to the at least a portion of the distal end surface for at least a portion of a path the rod travels toward the extrusion head in the 3D printing system (506), and the method thereafter ends (508) in the example embodiment.

Figure 6:
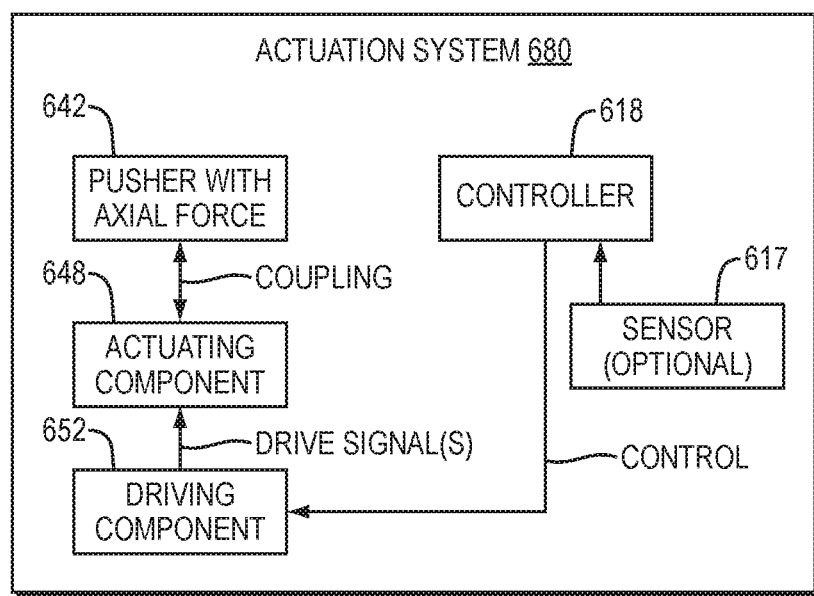
FIG. 6 is a block diagram of an example embodiment of an actuation system for use in a three-dimensional (3D) printing system.

FIG. 6 is a block diagram of an example embodiment of an actuation system 680 for use in a three-dimensional (3D) printing system. The actuation system 680 comprises a pusher 642, an actuating component 648 coupled to the pusher 642; a driving component 252 configured to drive the actuating component 648, and a controller 618. The controller 618 may be configured to cause the driving component 252 to drive the actuating component 648 to move in a manner that causes the pusher 642 to apply an axial force to at least a portion of a distal end surface of a distal end of a rod of a build material. The rod may have distal and proximal ends relative to an extrusion head. The distal and proximal ends may have distal and proximal end surfaces, respectively. The axial force may be applied to the at least a portion of the distal end surface of the rod for at least a portion of a path the rod travels toward the extrusion head in the 3D printing system, such as the 3D printing system 100 of FIG. 1, disclosed above.

The actuation system 680 may further comprise a sensor 617. The sensor 617 may be any suitable sensor(s), such as an optical, capacitive, or mechanical sensor that may provide feedback to the controller 618 enabling the controller 618 to track location of the rod of build material 204. For example, the sensor 617 may enable the controller 618 to monitor drive current of the driving component 252 and determine location based on the current. Alternatively, the sensor 617 may not be employed and the controller may track location of the rod of build material 204 in an open-loop manner as a function of a theoretical commanded location. For example, according to an example embodiment, the driving component 252 may be a stepper motor and the controller 618 may track location of the rod based on a number of counts of the stepper motor and a direction of actuation commanded on the actuating component 648. It should be understood that the driving component 252 may be any suitable driving component for driving actuation of the actuating component 648 in multiple directions, such as reverse and forward. Further, the controller 618 may track location of the rod by tracking commands issued to components of the actuation system 680 and optionally based on time. Regardless of whether such tracking is performed with feedback or in an open-loop manner, such tracking may enable the actuation system 680 to be an automated system the loads and extrudes rods of build material for 3D printing, automatically.

According to an example embodiment, an extrusion assembly for use in a three-dimensional (3D) printing system may include an extrusion head configured to receive a build material and an actuation assembly. The actuation assembly may include an actuating component and a gripper. The gripper may be arranged to apply at least two opposing lateral forces to the build material, the at least two opposing lateral forces being applied to the build material for at least a portion of a path the build material travels toward the extrusion head. The actuating component may be arranged to cause linear motion of the gripper for the at least a portion of the path.

The at least two opposing lateral forces, in combination with the linear motion, cause corresponding shear forces to be applied to the build material. The shear forces correspond to the at least two lateral forces.

The build material 204 for use with the gripper may be in a form of a discrete rod or continuous feedstock.

According to an example embodiment, the gripper may be arranged to apply the at least two lateral forces via vacuum. Alternatively, such forces may be applied via pneumatics or in any other suitable way.

As the at least two opposing lateral forces are being applied to the build material, for the at least a portion of a path the build material travels toward the extrusion head, the gripper is moving linearly along with the build material since the actuating component is arranged to cause linear motion of the gripper for the at least a portion of the path. Further, according to an example embodiment, the at least two lateral forces may be sufficient to overcome extrusion forces. A surface area for contact of the build material may be configured such that the at least two lateral forces do not deform the build material, for example, by indenting the build material otherwise caused by individual contact points, such as teeth. According to an example embodiment, the at least two lateral forces may be distributed such that the build material maintains structure in an area over which such lateral forces are applied.

Figure 7:
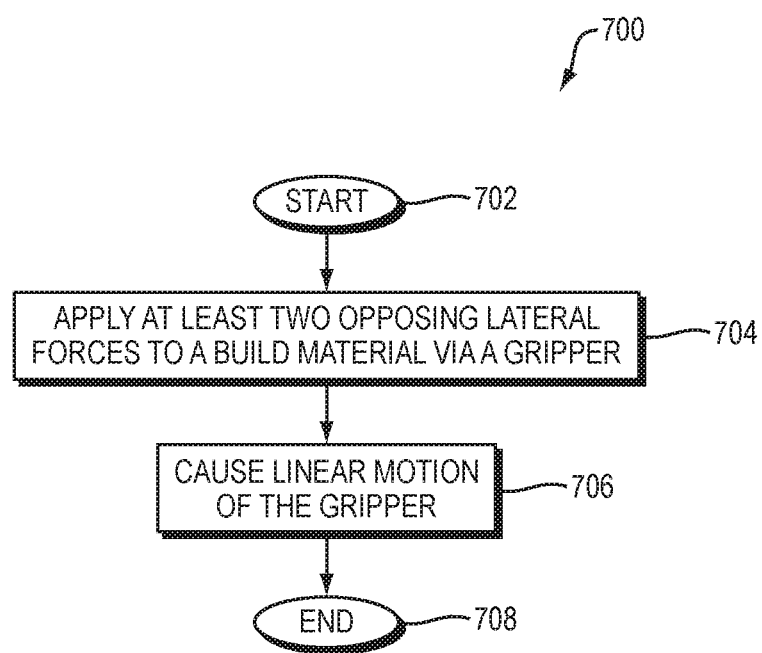
FIG. 7 is a flow diagram of an example embodiment of another method for moving a rod of build material in a three-dimensional (3D) printing system.

FIG. 7 is a flow diagram 700 of an example embodiment of another method for moving a rod of build material using a gripper in a three-dimensional (3D) printing system. The method begins (702) and applies at least two opposing lateral forces to a build material via a gripper, the at least two opposing lateral forces being applied to the build material for at least a portion of a path the build material travels toward an extrusion head (704). The method causes linear motion of the gripper for the at least a portion of the path the build material travels toward the extrusion head (706), and the method thereafter ends (708), in the example embodiment.

Figure 8:
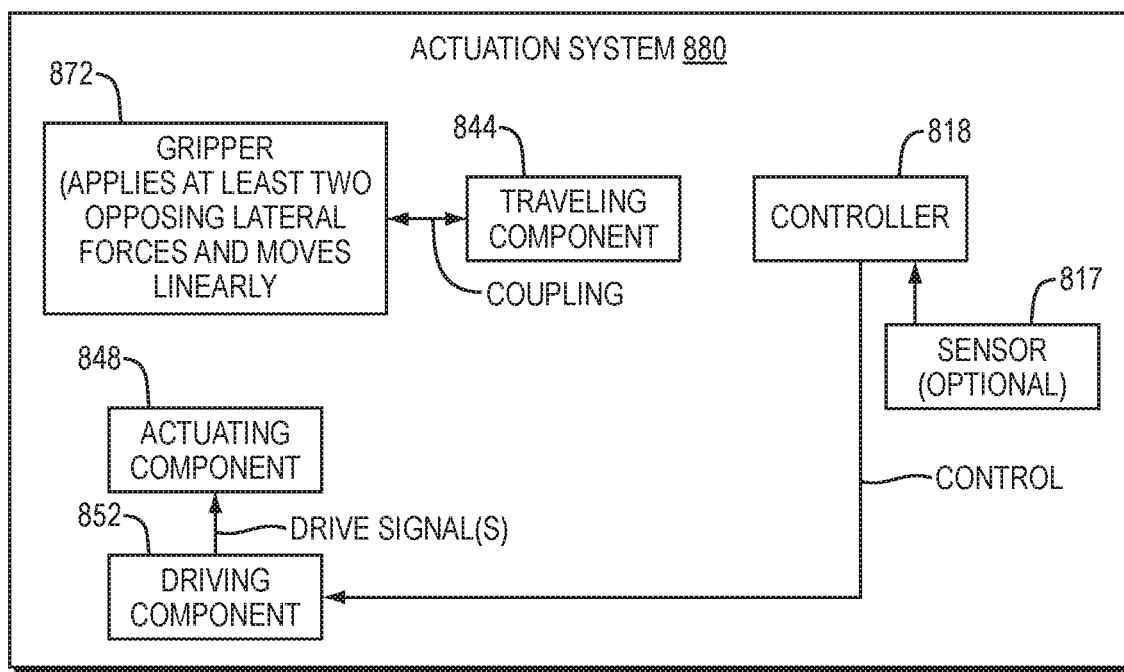
FIG. 8 is a block diagram of an example embodiment of an actuation system that uses a gripper.

FIG. 8 is a block diagram of an example embodiment of an actuation system 880 that uses a gripper 872. The actuation system 880 comprises the gripper 872 that is coupled to a traveling component 844, an actuating component 848 that is coupled to the traveling component 844; a driving component 852 that may be configured to drive the actuating component 848; and a controller 818 that may be configured to activate and deactivate the driving component 852.

The driving component 852 may be further configured to drive the actuating component 848 to cause the traveling component 844 to move bi-directionally relative to an extrusion head (not shown).

The actuation system 880 may further comprise a sensor 817. The sensor 817 may be any suitable sensor(s), such as an optical, capacitive, or mechanical sensor that may provide feedback to the controller 818 enabling the controller 818 to track location of build material 204. For example, the sensor 817 may enable the controller 818 to monitor drive current of the driving component 852 and determine location based on the current. Alternatively, the sensor 817 may not be employed and the controller may track location of the rod of build material 204 in an open-loop manner as a function of a theoretical commanded location.

Figure 9:
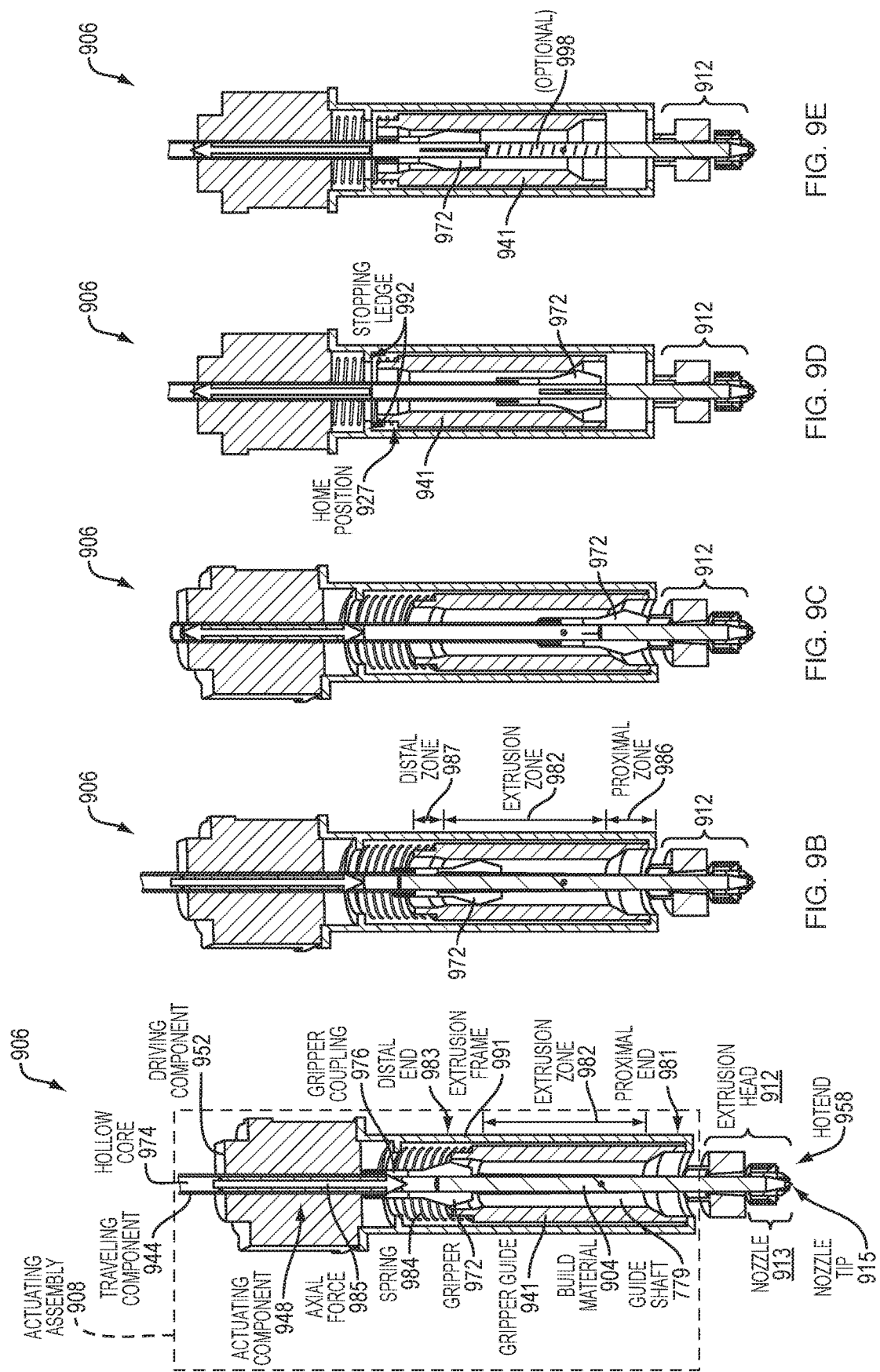
FIG. 9A is a cross sectional view of an example embodiment of an extrusion assembly that includes an actuation assembly in a start mode.
FIG. 9B is a cross sectional view of an example embodiment of the extrusion assembly of FIG. 9A with the actuation assembly transitioned to an extrusion mode.
FIG. 9C is a cross sectional view of an example embodiment of the extrusion assembly of FIG. 9A with the actuation assembly transitioned to a first media reload mode.
FIG. 9D is a cross sectional view of an example embodiment of the extrusion assembly of FIG. 9A with the actuation assembly transitioned to a second media reload mode.
FIG. 9E is a cross sectional view of an example embodiment of the extrusion assembly of FIG. 9A with the actuation assembly transitioned to a third media reload mode.

FIG. 9A is a cross sectional view of an example embodiment of an extrusion assembly 906 that includes an actuation assembly 908 in a start mode. The actuation assembly 908 includes an actuating component 848 and a gripper 972. The gripper 972 is arranged to apply at least two opposing lateral forces (not shown) to the build material 904. The at least two opposing lateral forces are applied to the build material 904 for at least a portion of a path the build material 104 travels toward an extrusion head 912. The actuating component 948 is arranged to cause linear motion of the gripper 972 for the at least a portion of the path. For example, the gripper 972 is arranged to apply the at least two opposing lateral forces while in the extrusion zone 982 as the gripper 972 is caused to travel linearly through the extrusion zone 982 toward the extrusion head 912.

In the example embodiment, the actuating component 948 is a captive motor. The actuation assembly further includes a traveling component 944, that is, a lead screw through the captive motor that is hollow, permitting the media to pass through its hollow core 974. In the example embodiment, the gripper is a collet. The lead screw is attached to the collet which normally operates in an open position, such that the media, that is, the build material 904, is not pinched or engaged. The lead screw, that is, the traveling component 944, may be attached to the gripper 972 in any suitable way, such as via a gripper coupling 976. The hotend 958 is located in a plane beneath a plane of the captive motor, in the example embodiment. A gripper guide 941, that is, a cam tube in the example embodiment, sits in-between the captive motor and the hotend 958. In normal operation, a rod of build material 904 to be extruded is dropped into the cam shaft between the hotend 958 and the motor, that is, the driving component 952.

To drive the build material 904 into the hotend, the motor is actuated to drive the lead screw and collet, that is, the traveling component 944 and the gripper 972, toward the build material 904, which is a rod of build material in the example embodiment, and push the gripper 972 toward the extrusion head because the gripper 972 is attached to the traveling component 944. Once the gripper 972 reaches the gripper guide 941 and enters, that is, the collet reaches the cam, the cam squeezes inward onto the feedstock and engages the feedstock such that the axial motion of the feedstock is now constrained to the axial motion of the cam and lead screw, which can be toward or away from the hotend 958 (provided motion away from the hotend 958 does not pull the collet out of the cam tube). For example, the gripper guide 941 may define a guide shaft 779 that has a profile causing the gripper 972 to constrict or dilate, imposing and releasing at least two opposing lateral forces on the build material 904.

Once the build material 904 has been pushed completely through the hotend 958, the collet continues forward to the hotend 958 until the build material 904 is released as the collet leaves the proximal end 981 of the cam tube, the proximal end 981 being closer to the extrusion head 912 relative to the distal end 983. Once the collet leaves the cam tube, it is withdrawn back toward the motor by reversing the direction of rotation on the lead screw. Since the force required to collapse the collet is smaller than the force on the cam tube, the cam tube is driven back toward the motor engaging a spring 984. Once the spring force exceeds the force required to collapse the collet (or the cam bottoms out), the collet once again enters the cam tube, that is, the gripper guide 941, and is driven back toward the original position. At this point, a new rod may be loaded and the collet driven back toward the rod of build material 904 to begin the extrusion process again.

FIG. 9B is a cross sectional view of an example embodiment of the extrusion assembly FIG. 9A with the actuation assembly transitioned to an extrusion mode. As illustrated in FIG. 9B, the gripper guide 941 defines a distal zone 987, extrusion zone 982, and proximal zone 986. The proximal zone 986 is closer to the extrusion head 917 relative to the distal zone. An inner surface profile of the gripper guide 941 is such that the gripper 972 is configured to be open (e.g., dilated) in the distal and proximal zones and compressed (e.g., constricted) in the extrusion zone 982 so as to grip the build material 904 by applying at least two lateral forces. In the example embodiment of FIG. 9B, the gripper 972 is clamped and the build material 904 may be extruded or retracted, whereas in FIG. 9A the gripper 972 is open with no hold on the build material 904.

FIG. 9C is a cross sectional view of an example embodiment of the extrusion assembly of FIG. 9A with the actuation assembly transitioned to a first media reload mode in which the gripper 972 opens and the driving component 952 reverses direction.

FIG. 9D is a cross sectional view of an example embodiment of the extrusion assembly of FIG. 9A with the actuation assembly transitioned to a second media reload mode in which the driving component 952 reverses, causing the gripper 972 to reverse up and into the gripper guide 941 and the gripper guide 941 slides in a direction away from the extrusion head to be above the build material 904 before the gripper 972 is caused to closed.

FIG. 9E is a cross sectional view of an example embodiment of the extrusion assembly of FIG. 9A with the actuation assembly transitioned to a third media reload mode in which the gripper guide 941 bottoms out, the gripper 972 closes, and the gripper rides to the top. Once the gripper 972 reaches an open part of the gripper guide, the gripper 972 opens and the gripper guide 941 springs back the down position as shown in FIG. 9A.

In the example embodiment of FIG. 9E, a telescoping media guide 998 is coupled to the gripper 972. The telescoping media guide 998 is optional and may be employed, for example, to ensure that hold on the build material 904 is maintained in an event the extrusion zone 982 is long. The telescoping media guide 998 may be a spring or any other suitable compliant element.

The actuation assembly 908 may further include a gripper guide 941, the gripper 941 guide arranged to cause the gripper 941 to apply the at least two opposing lateral forces (not shown). The actuation assembly may further include a spring 984 arranged to cause the gripper guide 941 to move in a direction away from the extrusion head 912 and toward a home position 927 for the gripper guide 941 within the actuation assembly 908.

The extrusion assembly may include an extrusion frame 991 arranged to house the gripper 972, a gripper guide 941 for the gripper 972, and a spring 984.

The extrusion frame 991 may define a stopping ledge 992 within the frame 991, the stopping ledge 992 arranged to stop movement of the gripper guide 941 in a direction away from the extrusion head 912. The stopping ledge 992 may define the home position 927 for the gripping guide 941 and the gripper 972.

The extrusion assembly 906 may further comprise a traveling component 944, as disclosed above. The gripper 972 may be coupled to the traveling component 944 and the actuation assembly 908 may further include: the gripper guide 941 arranged to cause the gripper 972 to dilate and contract within the gripper guide 941 and a driving component 952 configured to drive the actuating component 948 to cause the traveling component 944 to move bi-directionally relative to the extrusion head 912.

The traveling component 944 may define a hollow core 974 configured to enable the build material to pass through the traveling component 944 and toward the extrusion head 912, as disclosed above.

According to another example embodiment, a linear motor may drive the media into the hotend. A linear motor such configured has no rotating components and may be placed adjacent to the media to be extruded. The linear motor may have a pushing mechanism similar to the gear-type pusher shown in connection with FIGS. 4A and 4B, or the collet type pusher as show in connection with FIGS. 9A-E, or a gated pushing mechanism which may be actuated in and out.

It should be understood that various example embodiments of an extrusion assembly may be shown in figures as being oriented directly in-line with the nozzle tip on a build plate, such as the build plate 120 of FIG. 1, disclosed above. However, this need not be the case. An extrusion assembly as disclosed herein may be oriented at any angle off-axis which may advantageously reduce an amount head space required within the 3D printing system.

Figure 10:
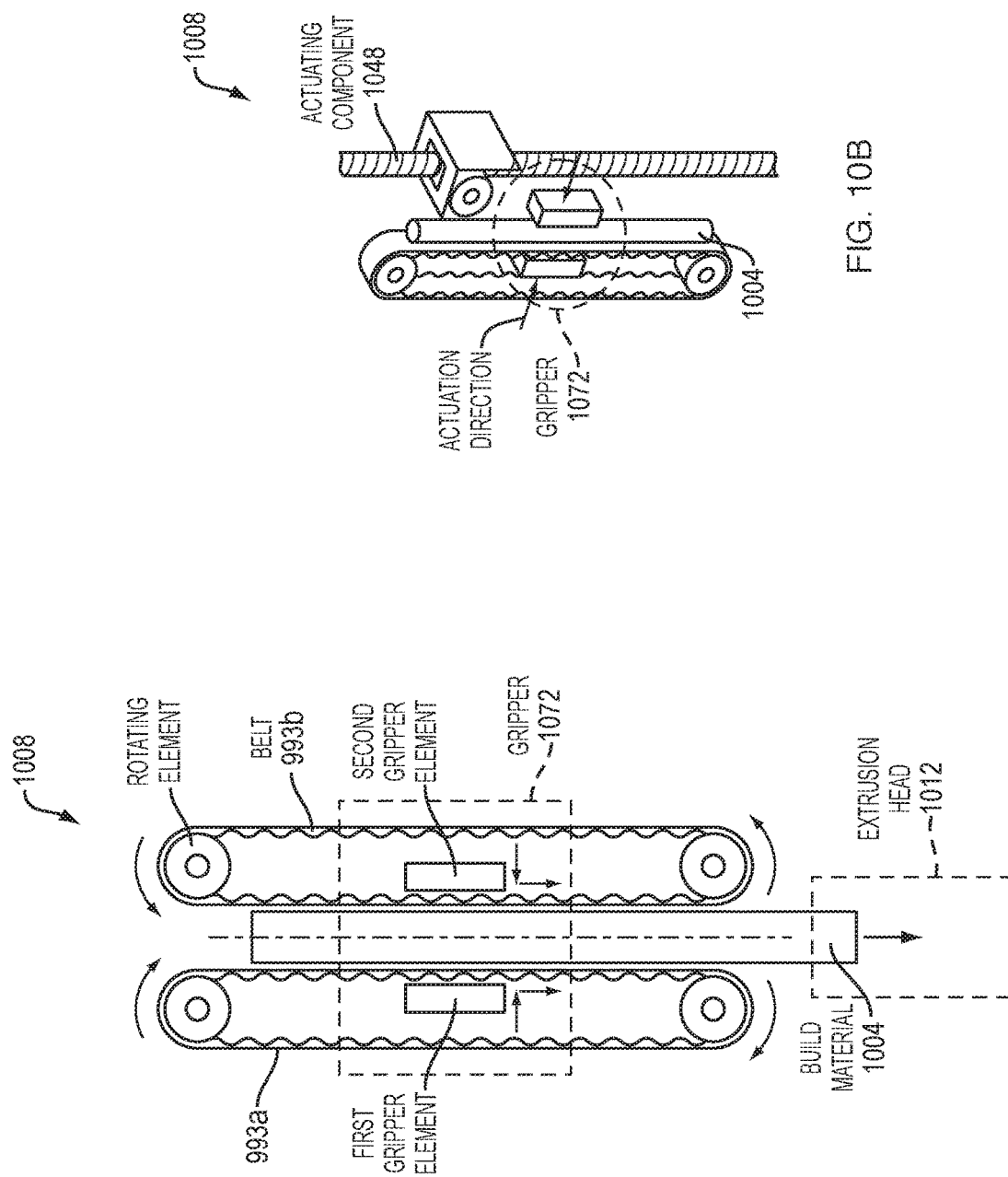
FIG. 10A is block diagram of an example embodiment of a gripper.
FIG. 10B is block diagram of an example embodiment the gripper of FIG. 10A.

FIG. 10A is block diagram of an example embodiment of a gripper 1072. According to the example embodiment, an actuation assembly (not shown) further comprises a first 993*a* belt and a second belt 993*b* and the build material 1004 may be arranged between surfaces of the first belt and second belts.

The gripper 1072 may be coupled to the first belt 993*a* and the second belt 993*b* and arranged to apply the at least two lateral forces to the build material 1004 via the first and second belts. For example, an actuating component, such as the actuating component 1048 of FIG. 10B may cause lateral movement of at least one gripper element causing the at least one gripper element to contact a respective belt and apply a lateral force to the build material 1004. According to an example embodiment, at least one of the gripper elements may be fixed to a respective belt applying at least one lateral force. As such, to move the build material 1004 toward the extrusion head 1010, the actuating component 1048 may be driven in manner that causes a second gripper element to apply at least one second lateral force that opposes the lateral force applied by the first gripping element.

FIG. 10B is block diagram of an example embodiment of the gripper of FIG. 10A.

Figure 11:
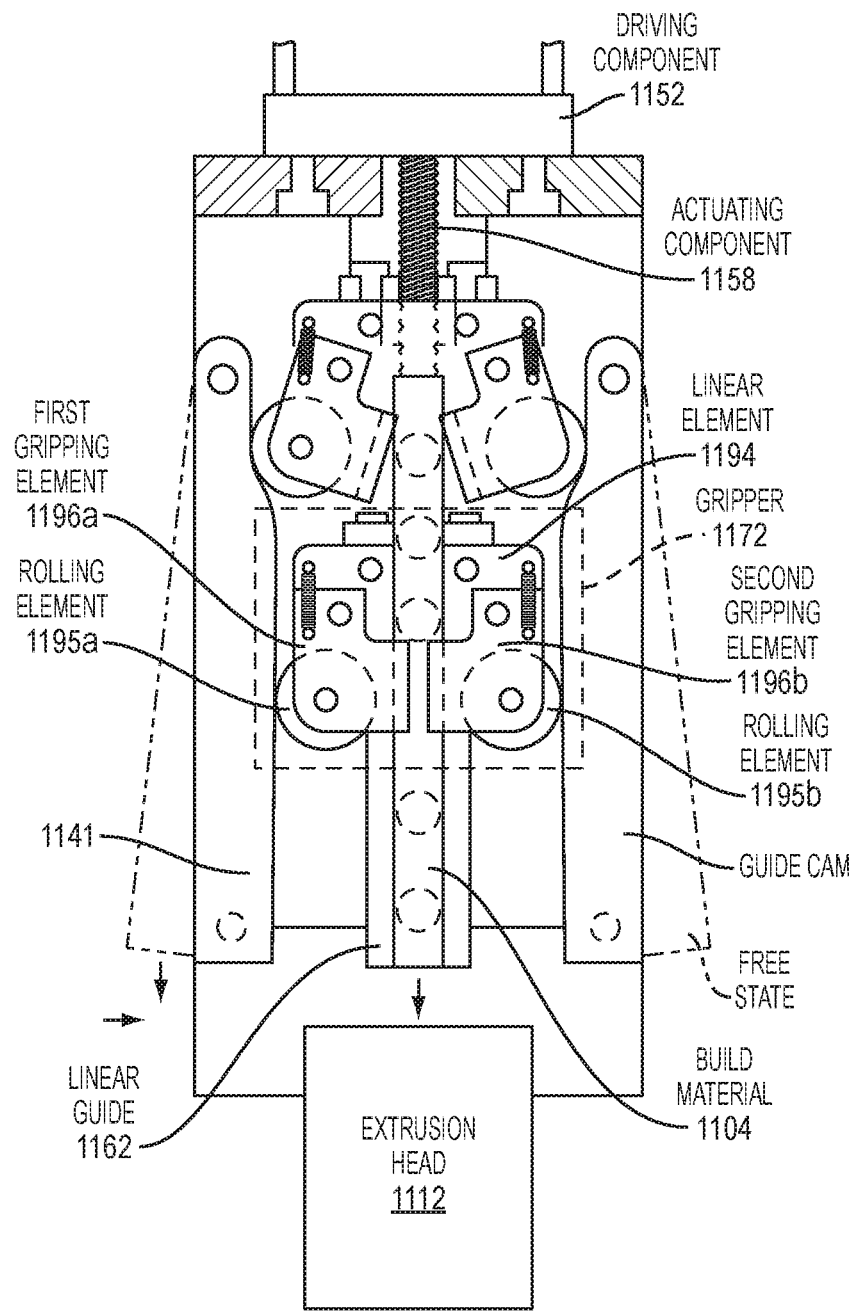
FIG. 11 is block diagram of another example embodiment of an actuation assembly that includes a gripper.

FIG. 11 is block diagram of another example embodiment of a gripper 1172 and a gripper guide 1141. The gripper 1172 may include: a linear element 1194; a first rolling element 1195*a*; a second rolling element 1195*b*; a first gripping element 1196*a*; and a second gripping element 1196*b*. The linear element 1194 may be coupled to the first and second gripping elements and the at least two rolling elements.

The extrusion assembly may further comprise a linear guide 1162 and the gripper 1172 may be arranged to travel the linear guide 1162.

The linear motion of the gripper 1172 may cause the gripper 1172 to enter a gripper guide 1141 that may compressing and dilate the gripper via a profile of an internal surface of the guide 1141, such as a profile of a path of travel by the rolling elements along the profile that may cause gripping elements of the gripper 1172 to move in a manner that applies and removes the at least two lateral forces.

Figure 12:
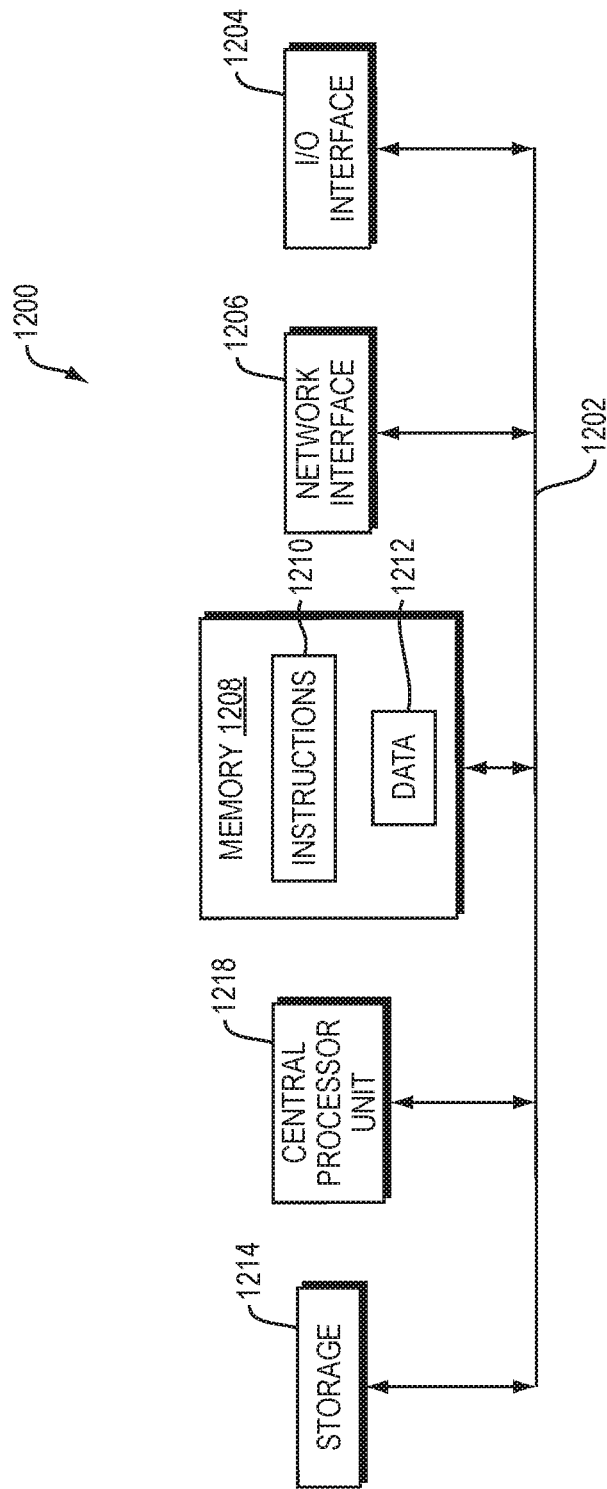
FIG. 12 is a block diagram of an example internal structure of a computer in which various embodiments of the present disclosure may be implemented.

FIG. 12 is a block diagram of an example of the internal structure of a computer 1200 in which various embodiments of the present disclosure may be implemented. The computer 1200 contains a system bus 1202, where a bus is a set of hardware lines used for data transfer among the components of a computer or processing system. The system bus 1202 is essentially a shared conduit that connects different elements of a computer system (e.g., processor, disk storage, memory, input/output ports, network ports, etc.) that enables the transfer of information between the elements. Coupled to the system bus 1202 is an I/O device interface 1204 for connecting various input and output devices (e.g., keyboard, mouse, displays, printers, speakers, etc.) to the computer 1200. A network interface 1206 allows the computer 1200 to connect to various other devices attached to a network. Memory 1208 provides volatile storage for computer software instructions 1210 and data 1212 that may be used to implement embodiments of the present disclosure. Disk storage 1214 provides non-volatile storage for computer software instructions 1210 and data 1212 that may be used to implement embodiments of the present disclosure. A central processor unit 1218 is also coupled to the system bus 1202 and provides for the execution of computer instructions.

Further example embodiments disclosed herein may be configured using a computer program product; for example, controls may be programmed in software for implementing example embodiments. Further example embodiments may include a non-transitory computer-readable medium containing instructions that may be executed by a processor, and, when loaded and executed, cause the processor to complete methods described herein. It should be understood that elements of the block and flow diagrams may be implemented in software or hardware, such as via one or more arrangements of circuitry of FIG. 12, disclosed above, or equivalents thereof, firmware, a combination thereof, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein. Further, example embodiments and elements thereof may be combined in a manner not explicitly disclosed herein.

While example embodiments have been particularly shown and described, it will be understood by those skilled in the art that various changes in form and details may be made therein without departing from the scope of the embodiments encompassed by the appended claims.

What is claimed is:

1. An assembly for use in an additive manufacturing system, the assembly comprising:
    an extrusion head configured to receive a rod of build material along a longitudinal axis of the extrusion head; and
    an actuator movable relative to the extrusion head along an axis extending parallel to the longitudinal axis, a pushing component of the actuator configured to exert a force on a distal end of the rod of build material along the longitudinal axis toward the extrusion head, wherein the actuator is configured to swivel or pivot between a first configuration, in which the pushing component intersects the longitudinal axis for exerting said force, and a second configuration employed for loading the rod of build material into the assembly along the longitudinal axis, in which the pushing component does not intersect the longitudinal axis.

2. The assembly of claim 1, wherein the actuator includes a body and a protrusion of the pushing component extending outwardly from the body, wherein the protrusion intersects the longitudinal axis in the first configuration, and wherein the protrusion does not intersect the longitudinal axis in the second configuration.

3. The assembly of claim 1, further comprising a cam configured to transition the actuator from the first configuration to the second configuration.

4. The assembly of claim 3, wherein an interaction between a surface of the cam and a surface of the actuator causes the actuator to transition from the first configuration to the second configuration.

5. The assembly of claim 1, further comprising a guide channel configured to receive the rod of build material, wherein the guide channel defines a slot that is configured to receive at least a portion of the actuator.

6. The assembly of claim 5, wherein, in the first configuration, the at least the portion of the actuator is received by the slot, and wherein, in the second configuration, the at least the portion of the actuator is not received by the slot.

7. The assembly of claim 1, wherein the actuator includes a body and a protrusion of the pushing component extending outwardly from the body, and wherein the protrusion includes an interface surface configured to contact the rod of build material.

8. The assembly of claim 7, wherein the interface surface is configured to exert the force on the rod of build material when the actuator moves in a first direction toward the extrusion head, and wherein a surface of the body extends further in the first direction than the interface surface.

9. An assembly for use in an additive manufacturing system, the assembly comprising:
    an extrusion head configured to receive a rod of build material along a first axis;
    an actuator movable along a second axis extending parallel to the first axis from a first position to a second position and from the second position to the first position, wherein the actuator is closer to the extrusion head in the first position than in the second position, and wherein a pushing component of the actuator is configured to exert a force on a distal end of the rod of build material along the first axis toward the extrusion head; and
    a cam configured to interact with the actuator as the actuator moves from the first position to the second position to cause the pushing component to move in a direction transverse to the first axis to a configuration employed for loading the rod of build material into the assembly along the first axis.

10. The assembly of claim 9, wherein the actuator includes a body and a protrusion of the pushing component extending outwardly from the body, and wherein the cam is configured to interact with the actuator as the actuator moves from the first position to the second position to cause the protrusion to move in the direction transverse to the first axis.

11. The assembly of claim 9, wherein when the cam interacts with the actuator as the actuator moves from the first position to the second position, the actuator transitions from a first configuration, in which the pushing component intersects the first axis for exerting said force, to a second configuration in the direction transverse to the first axis, in which the pushing component does not intersect the first axis.

12. The assembly of claim 9, further comprising a guide channel configured to receive the rod of build material, wherein the guide channel defines a slot that is configured to receive at least a portion of the actuator.

13. The assembly of claim 12, wherein, in a first configuration in which the pushing component is configured to exert said force, the at least the portion of the actuator is received by the slot, and wherein, in a second configuration employed for said loading of the rod of build material, the at least the portion of the actuator is not received by the slot.

14. The assembly of claim 9, wherein the actuator includes a body and a protrusion of the pushing component extending outwardly from the body, and wherein the protrusion includes an interface surface configured to contact the rod of build material.

15. The assembly of claim 14, wherein the interface surface is configured to exert the force on the rod of build material when the actuator moves in a first direction toward the first position, and wherein a surface of the body extends further in the first direction than the interface surface.

16. An assembly for use in an additive manufacturing system, the assembly comprising:
an extrusion head configured to receive a rod of build material along a longitudinal axis of the extrusion head; and
an actuator movable relative to the extrusion head along an axis extending parallel to the longitudinal axis by a linear actuating component, wherein the actuator includes a body and a protrusion extending outwardly from the body, wherein a surface of the protrusion is configured to exert a force on a distal end of the rod of build material along the longitudinal axis toward the extrusion head, and wherein the protrusion is configured to move relative to the body in a direction transverse to the longitudinal axis to a configuration employed for loading the rod of build material into the assembly along the longitudinal axis.

17. The assembly of claim 16, further including a cam, wherein the cam is configured to cause the protrusion to move relative to the body in the direction transverse to the longitudinal axis.

18. The assembly of claim 16, further comprising a guide channel configured to receive the rod of build material, wherein the guide channel defines a slot that is configured to receive at least a portion of the actuator.

19. The assembly of claim 18, wherein, when the protrusion moves relative to the body in the direction transverse to the longitudinal axis, the protrusion transitions from a first configuration to a second configuration employed for said loading of the rod of build material, wherein, in the first configuration, the at least the portion of the actuator is received by the slot, and wherein, in the second configuration, the at least the portion of the actuator is not received by the slot.

20. The assembly of claim 16, wherein the surface of the protrusion is configured to exert the force on the rod of the build material when the actuator moves the protrusion in a first direction along the longitudinal axis toward the extrusion head, and wherein a surface of the body extends further in the first direction than the surface of the protrusion.

* * * * *